United States Patent
Piaskowski et al.

(10) Patent No.: US 10,558,183 B2
(45) Date of Patent: *Feb. 11, 2020

(54) SYSTEMS AND METHODS FOR CREATING AND USING EQUIPMENT DEFINITIONS

(71) Applicant: Johnson Controls Technology Company, Plymouth, MI (US)

(72) Inventors: Ryan A. Piaskowski, Milwaukee, WI (US); Michael E. Wagner, Delafield, WI (US); Daniel J. Sonnemann, Waukesha, WI (US); Jeffrey Taylor, Glendale, WI (US); Corey A. Poquette, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/592,031

(22) Filed: May 10, 2017

(65) Prior Publication Data

US 2017/0242413 A1    Aug. 24, 2017

Related U.S. Application Data

(63) Continuation of application No. 14/251,414, filed on Apr. 11, 2014, now Pat. No. 9,703,276.

(51) Int. Cl.
*G05B 15/02* (2006.01)
*H04L 12/28* (2006.01)

(52) U.S. Cl.
CPC .......... *G05B 15/02* (2013.01); *H04L 12/2809* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 7,164,972 | B2 | 1/2007 | Imhof et al. |
| 7,502,323 | B2 | 3/2009 | Brun et al. |
| 7,634,555 | B1 | 12/2009 | Wainscott et al. |
| 8,190,728 | B1 | 5/2012 | Wainscott et al. |

(Continued)

OTHER PUBLICATIONS

Amaral et al., Towards a robust solution in Building Automation Systems: supporting rapid prototyping and analysis, 2013 IEEE, 4 pages.

(Continued)

*Primary Examiner* — Van H Nguyen
(74) *Attorney, Agent, or Firm* — Foley & Lardner LLP

(57) ABSTRACT

Systems and methods for creating and using equipment definitions are provided. An archetypal device used to identify one or more data points associated with the archetypal device. A point definition is generated for each identified data point associated with the archetypal device. Each point definition includes an abstraction of a text string extracted from the corresponding data point that is applicable to multiple different devices of the same type of building equipment. The generated point definitions are used to create an equipment definition for a type of building equipment. The equipment definition can be used to identify data points associated with other devices of the same type of building equipment and to automatically create equipment objects representing such devices.

20 Claims, 20 Drawing Sheets

(56) References Cited

U.S. PATENT DOCUMENTS

| | | |
|---|---|---|
| 8,270,767 B2 | 9/2012 | Park |
| 8,325,637 B2 | 12/2012 | Salsbury et al. |
| 8,863,018 B2 | 10/2014 | Taylor et al. |
| 9,411,327 B2 | 8/2016 | Park |
| 9,703,276 B2 * | 7/2017 | Piaskowski ............ G05B 15/02 |
| 2007/0055390 A1 | 3/2007 | Simon et al. |
| 2008/0209342 A1 | 8/2008 | Taylor et al. |
| 2008/0222565 A1 | 9/2008 | Taylor et al. |

OTHER PUBLICATIONS

Oezluek et al., Optimal Device Placement Planning for Wireless Building Automation Systems, 2013 IEEE, 4 pages.

Office Action for U.S. Appl. No. 14/251,414, dated Nov. 17, 2016, 16 pages.

Notice of Allowance for U.S. Appl. No. 14/251,414, dated Mar. 10, 2017, 5 pages.

* cited by examiner

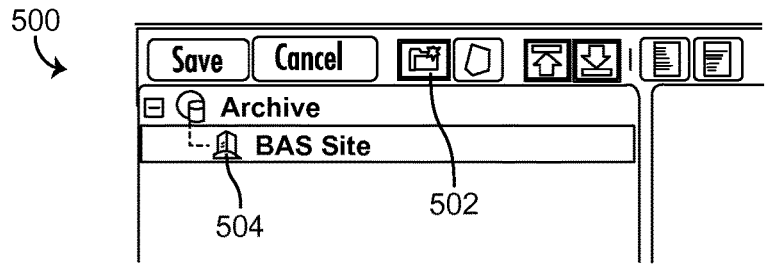
FIG. 5
Create new spaces
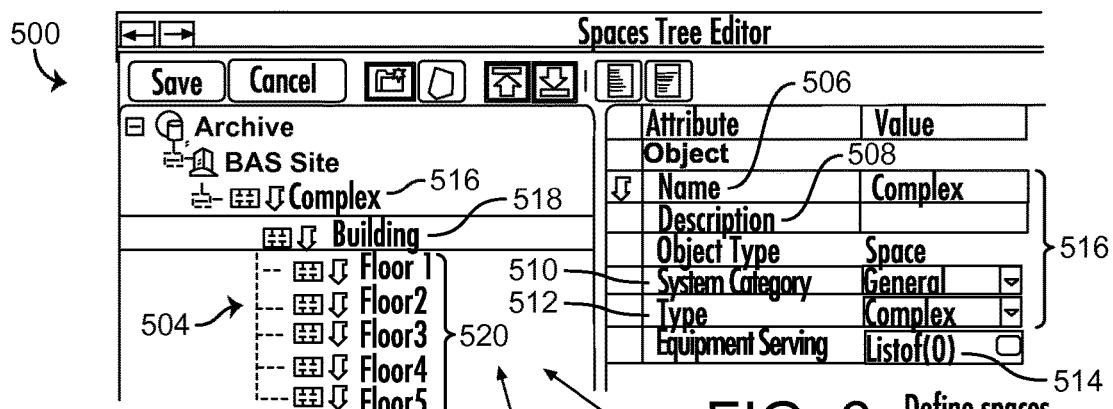
FIG. 6  Define spaces
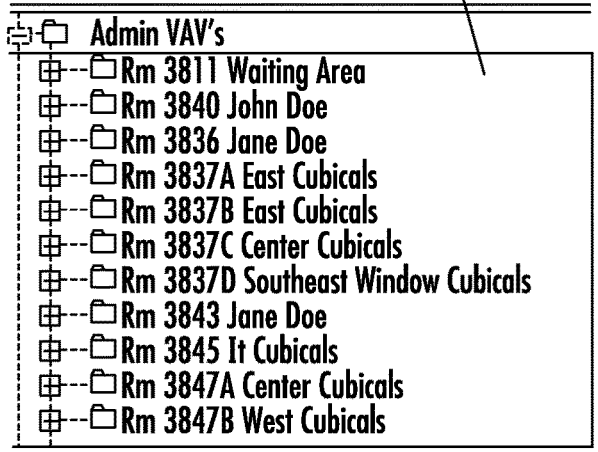
FIG. 7
FIG. 8

| Attribute | Value | Un |
|---|---|---|
| Object | | |
| Name —902 | Building X Vav Boxes | |
| Description —904 | | |
| Object Type | Equipment Definition | |
| System Category —906 | Hvac ▼ —908 | |
| Subtype —910 | Terminal Units ▼ —912 | |
| Id Set —914 | Subsystem Category ▼ —916 | |

FIG. 9  Create new equipment definition

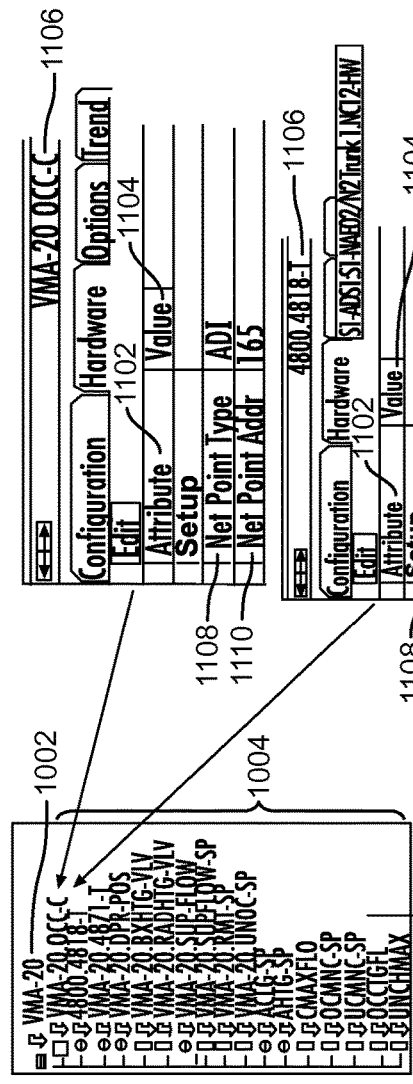

Select equipment definition

Equipment Discovery Table

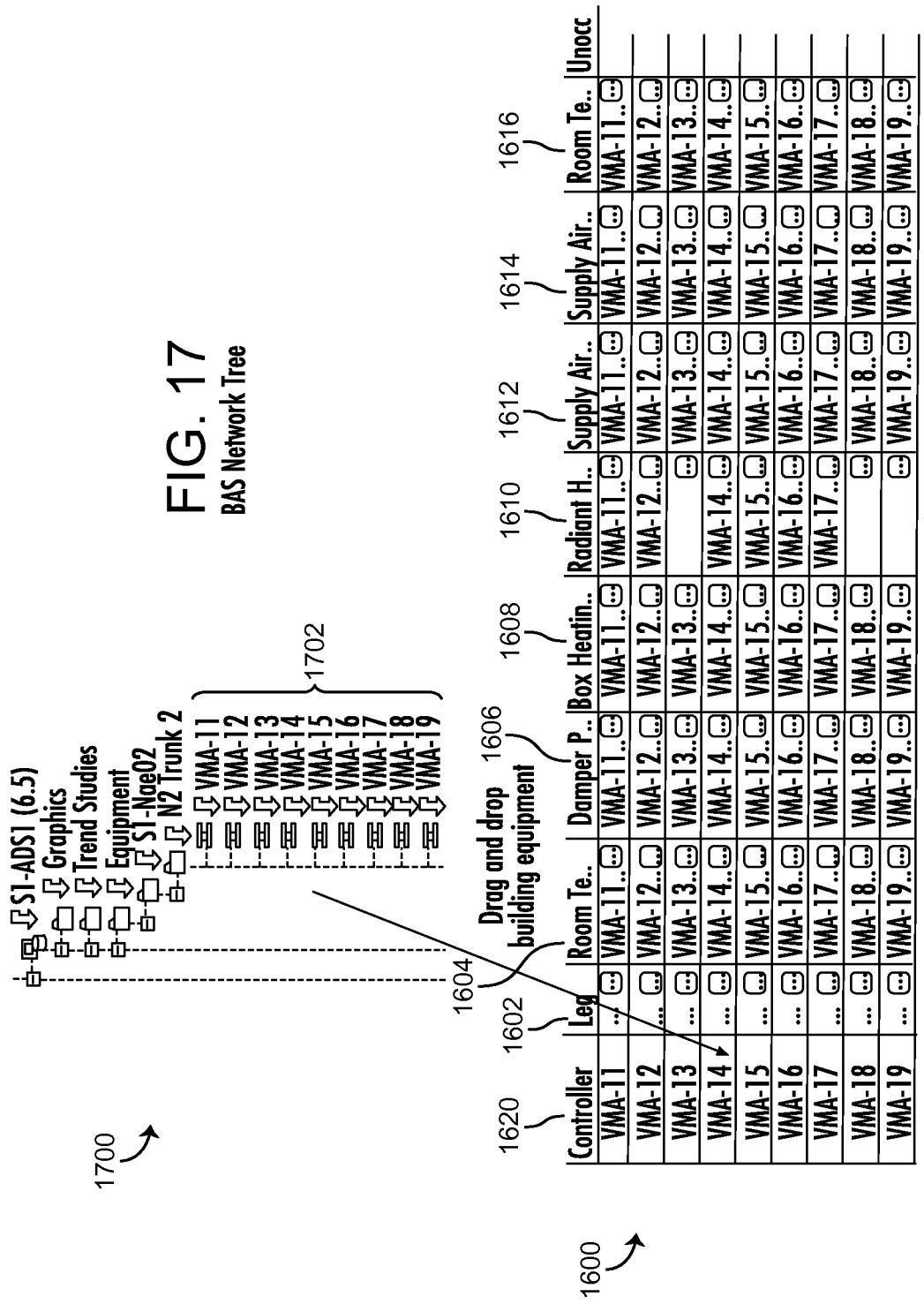

FIG. 19
Equipment Definitions

| Label | Short Name | ... | Instance | Net Point Address | Net Point Type | Search Criteria |
|---|---|---|---|---|---|---|
| Zone Temperature | ZN-T | | 0 | 1 | AI | *T* |
| Occupancy | OCC | | 0 | 165 | ADI | *OCC-C* |
| Zone Temperature Setpoint | ZN-SP | | 0 | 197 | ADF | *RMT-SP* |

FIG. 20
Data Points Network

- VMA-46
- VMA-33
  - VMA-33.OCC-C
  - VMA-33.4854B-T
  - VMA-33.DPRPOS
  - VMA-33.BXHNG-VLV
  - VMA-33.RADNG-VLV
  - VMA-33.SUP-FLOW
  - VMA-33.SUP-FLOW-SP
  - VMA-33.RMT-SP
  - VMA-33.UNOC-SP
  - ACLG-SP
  - AHTG-SP

FIG. 21
Equipment Object

| SETUP | |
|---|---|
| ZONE TEMPERATURE | Object Name: VMA-33.4854B-T<br>Reference 1-ADS1: S1-NAE02/N2 Trunk 1.NC12-HW VMA-33.4800-12 4854B-T<br>Attribute: Present Value |
| OCCUPANCY | OBJECT NAME: VMA-33.OCC-C<br>REFERENCE: S1-ADS1: S1-NAE02/N2 Trunk 1.NC12-HW VMA-33. Clock<br>Attribute: Present Value |
| ZONE TEMPERATURE SETPOINT | OBJECT NAME: VMA-33.RMT-SP<br>REFERENCE: S1-ADS1: S1-NAE02/N2 Trunk1.NC12-HW-33.RmSetpt<br>Attribute: Present Value |

FIG. 23
Equipment object

| Setup | |
|---|---|
| Zone Temperature — 2302 | Object Name: VMA-33.4854B-T<br>Reference: 1-ADS1: S1-NAE02/N2 Trunk 1.NC12-HW VMA-33.4800-12.4854B-T — 2308<br>Attribute: Present Value |
| Occupancy — 2304 | Object Name: VMA-33.OCC-C<br>Reference: S1-ADS1: S1-NAE02/N2 Trunk 1.NC12-HW VMA-33. Clock — 2310<br>Attribute: Present Value |
| Zone Temperature Setpoint — 2306 | Object Name: VMA-33.RMT-SP<br>Reference: S1-ADS1: S1-NAE02/N2 Trunk 1.NC12-HW-33.RmSetpt — 2312<br>Attribute: Present Value |

Labels defined by name attribute

Data values defined by reference attribute

FIG. 24
User interface

| 031-Room | |
|---|---|
| > VAN 33 | |
| > ZN-T<br>ZONE TEMPERATURE — 2302 | 76.3 °F — 2308 |
| > ZN-SP<br>ZONE SETPOINT TEMPERATURE — 2304 | 73.1 °F — 2312 |
| OCC<br>OCCUPANCY — 2306 | OCCUPIED — 2310 |

2400

Building Objects

Relationship Table

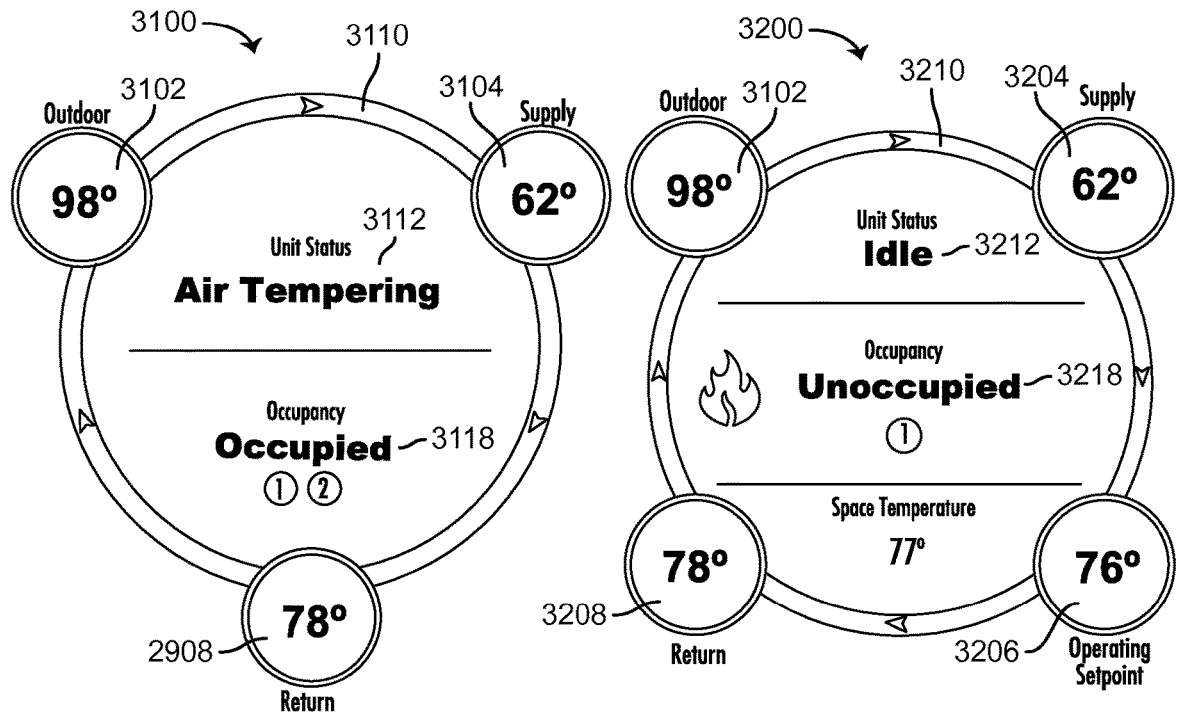
FIG. 31
FIG. 32
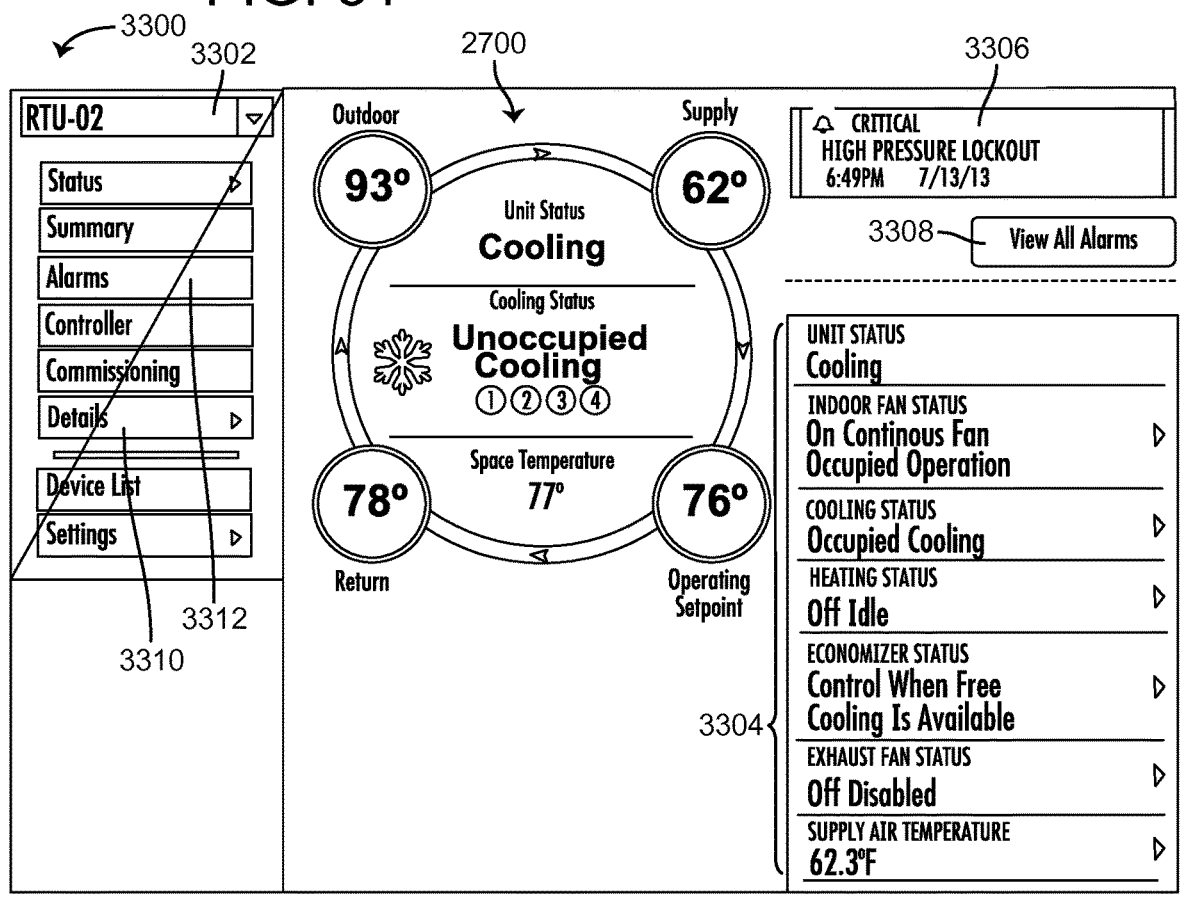
FIG. 33

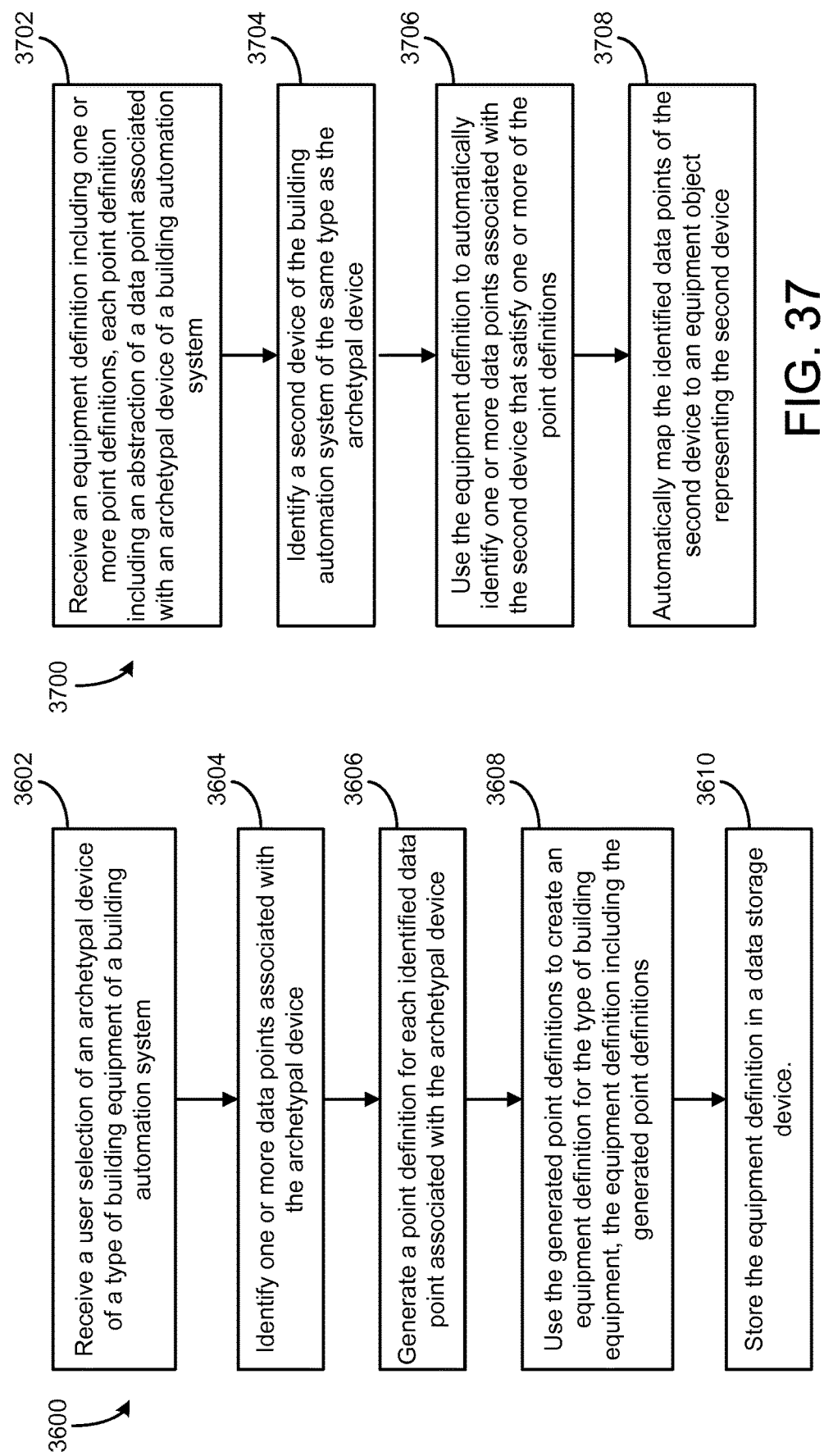

SYSTEMS AND METHODS FOR CREATING AND USING EQUIPMENT DEFINITIONS

CROSS-REFERENCE TO RELATED PATENT APPLICATION

This application is a continuation of U.S. patent application Ser. No. 14/251,414 filed Apr. 11, 2014, now U.S. Pat. No. 9,703,276 issued on Jul. 11, 2017, the entire disclosure of which is incorporated by reference herein.

BACKGROUND

The present disclosure relates generally to the field of building automation systems. The present disclosure relates more particularly to systems and methods for creating and using equipment definitions for building equipment in a building automation system.

A building automation system (BAS) is, in general, a system of devices configured to control, monitor, and manage equipment in or around a building or building area. A BAS can include a heating, ventilation, and air conditioning (HVAC) system, a security system, a lighting system, a fire alerting system, another system that is capable of managing building functions or devices, or any combination thereof. BAS devices may be installed in any environment (e.g., an indoor area or an outdoor area) and the environment may include any number of buildings, spaces, zones, rooms, or areas. A BAS may include METASYS building controllers or other devices sold by Johnson Controls, Inc., as well as building devices and components from other sources.

A BAS may include one or more computer systems (e.g., servers, BAS controllers, etc.) that serve as enterprise level controllers, application or data servers, head nodes, master controllers, or field controllers for the BAS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BAS, its subsystems, and devices.

SUMMARY

One implementation of the present disclosure is a method for creating an equipment definition for a type of building equipment in a building automation system. The method includes operating an archetypal device of the type of building equipment to affect a variable state or condition within a building and identifying one or more data points associated with the archetypal device. Each of the identified data points includes a text string specific to the archetypal device. The method includes automatically creating, for each of the identified data points, an abstraction of the text string specific to the archetypal device. The abstraction of the text string includes a portion of the text string that is applicable to multiple different devices of the same type of building equipment. The method includes generating a point definition for each identified data point associated with the archetypal device. Each point definition includes the abstraction of the text string of the corresponding data point. The method includes using the generated point definitions to create an equipment definition for the type of building equipment. The equipment definition includes one or more of the generated point definitions.

In some embodiments, the method includes using the stored equipment definition to automatically identify one or more data points associated with a second device of the same type of building equipment and automatically mapping the identified data points of the second device to an equipment object representing the second device.

In some embodiments, the method includes providing a user interface to a client device. The user interface may include a display of one or more devices of the building automation system. The method may include receiving a user selection of the archetypal device via the user interface.

In some embodiments, each point definition includes a criterion for identifying a data point associated with a second device of the same type of building equipment of the building automation system. In some embodiments, the criterion for identifying the data point associated with the second device includes at least one of an instance number of the data point, a network address of the data point, or a network point type of the data point. In some embodiments, the criterion for identifying the data point associated with the second device includes the abstraction of the text string of the corresponding data point of the archetypal device.

In some embodiments, the method includes providing a user interface for visualizing the equipment definition to a client device. The user interface may include a point definition portion having a display of the generated point definitions, a user input portion configured to receive a user selection of one or more of the point definitions displayed in the point definition portion, and a display data portion having an indication of an abstracted data point corresponding to each of the point definitions selected via the user input portion.

In some embodiments, the method includes receiving a user selection of one or more of the point definitions and automatically mapping one or more data points of a second device that satisfy the selected point definitions to a user interface for visualizing data associated with the second device.

In some embodiments, the method includes associating the equipment definition with a category of building equipment and using the equipment definition to filter building equipment of the building automation system by the category associated with the equipment definition.

Another implementation of the present disclosure is a method for creating and using an equipment object representing building equipment of a building automation system. The method includes obtaining an equipment definition for a type of building equipment. The equipment definition includes one or more point definitions, each point definition including an abstraction of a text string extracted from a data point associated with an archetypal device of the type of building equipment. The method includes identifying a second device of the building automation system of the same type as the archetypal device, using the equipment definition to automatically identify one or more data points associated with the second device that satisfy one or more of the point definitions, automatically mapping the identified data points of the second device to an equipment object representing the second device, and using the equipment object to monitor and control the second device to affect a variable state or condition within a building.

In some embodiments, each point definition includes a criterion for identifying a data point associated with the second device. In some embodiments, the criterion for identifying the data point associated with the second device comprises at least one of an instance number of the data point, a network address of the data point, or a network point type of the data point. In some embodiments, the criterion for identifying the data point associated with the second device includes the abstraction of the text string of the corresponding data point of the archetypal device. In some embodiments, the criterion for identifying the data point associated with the second device includes device specific information (e.g., MAC address, IP address, network address, etc.).

In some embodiments, using the equipment definition to identify one or more data points associated with the second device includes extracting a search criterion from each point definition of the equipment definition, accessing a network of the building automation system to determine one or more data points associated with the second device, using the extracted search criterion to search the data points of the second device for a data point that satisfies the search criterion, and identifying the data point that satisfies the search criterion as a data point associated with the second device that satisfies one or more of the point definitions.

In some embodiments, automatically mapping the identified data points of the second device to the equipment object includes determining a network address for each identified data point of the second device and mapping the network address for each identified data point of the second device to the equipment object representing the second device.

In some embodiments, determining a network address for each identified data point of the second device includes accessing a data point network for the building automation system and using the data point network to identify an existing relationship between the network address and an identified data point of the second device.

In some embodiments, the method includes using the equipment definition to automatically identify, by the processing circuit, one or more of the point definitions indicated as display data. In some embodiments, the processing circuit maps a data point of the second device to an equipment object representing the second device in response to a determination that the data point satisfies one or more of the point definitions to an equipment object. In some embodiments, the method includes creating a display object for display via a user interface and automatically mapping a data point of the second device to the display object in response to a determination that the data point satisfies one or more of the point definitions indicated as display data. The display object may include a subset of the data points of the corresponding equipment object. In some embodiments, the method includes providing a user interface to a client device. The user interface may include a display of the one or more data points mapped to the display object.

Another implementation of the present disclosure is a method for providing a display of data points associated with building equipment of a building automation system. The method includes obtaining an equipment definition for a type of building equipment. The equipment definition includes one or more point definitions and an indication of whether each point definition is identified as display data. Each point definition includes an abstraction of a text string extracted from a data point associated with an archetypal device of the type of building equipment. The method includes using the equipment definition to automatically identify one or more data points that satisfy one or more of the point definitions identified as display data and are associated with a second device of the same type of building equipment, automatically mapping the identified data points to a display object, and generating a user interface for display on a client device. The user interface includes a display of the one or more data points mapped to the display object. The method further includes using the display object to monitor and control the second device to affect a variable state or condition within a building.

In some embodiments, each point definition includes a search criterion for identifying a data point associated with the device. The search criterion may include the abstraction of the text string of the corresponding data point of the archetypal device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 5 is a drawing of a user interface for initiating the creation of building objects representing buildings and spaces within buildings, according to an exemplary embodiment.

FIG. 6 is a drawing of a user interface for creating and viewing building objects and defining relationships between building objects, according to an exemplary embodiment.

FIG. 7 is a drawing illustrating a technique for creating building objects representing rooms wherein folders with the names of the rooms to be created are dragged and dropped into the user interface of FIG. 6, according to an exemplary embodiment.

FIG. 8 is a drawing illustrating another technique for creating building objects wherein building object data is imported from a table or other data source, according to an exemplary embodiment.

FIG. 9 is a drawing of a user interface for creating an equipment definition and defining attributes of building equipment that references the equipment definition, according to an exemplary embodiment.

FIG. 10 is a drawing of a data points network that defines the data points associated with various BAS devices, according to an exemplary embodiment.

FIG. 11 is a drawing illustrating attributes of various data points provided by the data points network of FIG. 10, according to an exemplary embodiment.

FIG. 12 is a drawing of a user interface for viewing an equipment definition including a plurality of point definitions, search criteria associated with each point definition, and a display data portion identifying one or more of the defined data points to display, according to an exemplary embodiment.

FIG. 17 is a drawing of a BAS network tree defining various BAS devices that exist within the BAS, according to an exemplary embodiment.

FIG. 18 is a drawing of the equipment discovery table of FIG. 16 automatically populated with data points associated with various BAS devices defined by the BAS network tree and identified using the selected equipment definition, according to an exemplary embodiment.

FIGS. 19-21 are drawings illustrating an equipment object created using the equipment discovery table of FIG. 16, the equipment object having attributes defined by the point definitions of the selected equipment definition and mapped to various data points identified using the selected equipment definition, according to an exemplary embodiment.

FIGS. 23-24 are drawings illustrating a user interface for visualizing the data points mapped to an equipment object, according to an exemplary embodiment.

FIGS. 27-32 are drawings of user interfaces for visualizing data points associated with various equipment objects and/or building objects, according to an exemplary embodiment.

FIG. 33 is a drawing of one of the user interfaces of FIGS. 27-32 displayed via a client device such as a computer terminal, according to an exemplary embodiment.

FIG. 36 is a flowchart of a process for creating an equipment definition for a type of building equipment in a building automation system, according to an exemplary embodiment.

FIG. 37 is a flowchart of a process for using an equipment definition to create an equipment object representing building equipment of a building automation system, according to an exemplary embodiment.

DETAILED DESCRIPTION

Figure 1:
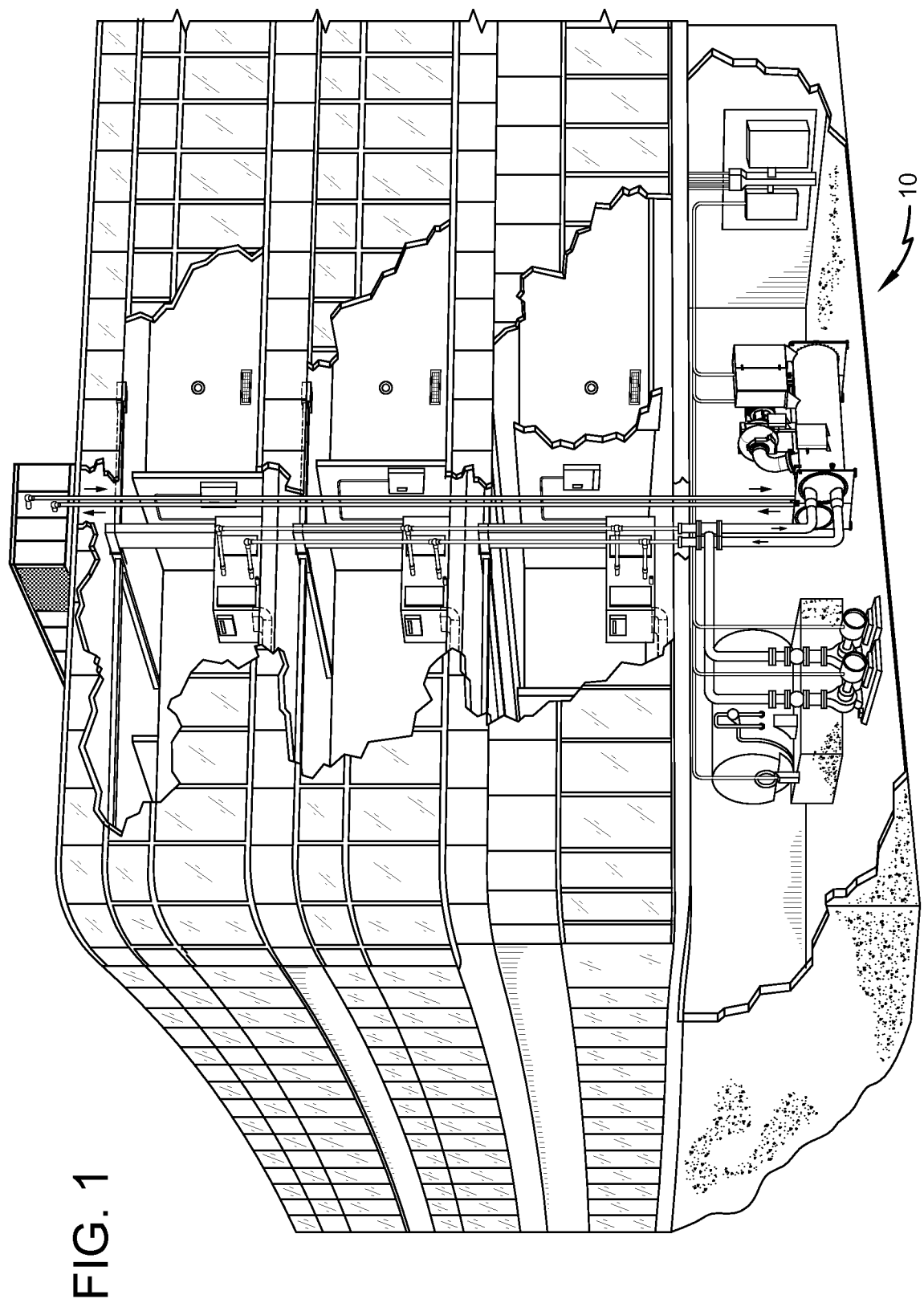
FIG. 1 is a perspective view drawing of a building equipped with a building automation system (BAS), according to an exemplary embodiment.

Referring generally to the FIGURES, systems and methods for creating and using equipment definitions in a building automation system (BAS) are shown, according to various exemplary embodiments. The systems and methods described herein may be used to generate equipment definitions for various types of building equipment. An equipment definition allows for the abstraction of equipment data from a physical piece of building equipment (e.g., an individual BAS device) so that the equipment data can be applied to a room or space. In some embodiments, an equipment definition defines various types of data points that are generally associated with a particular type of building equipment. For example, an equipment definition for a variable air volume modular assembly (VMA) may specify data point types such as room temperature, damper position, supply air flow, and/or other types data measured or used by the VMA.

Advantageously, an equipment definition specifies data point types as generalized types of data without regard to the model, manufacturer, vendor, or other differences between building equipment of the same general type. An equipment definition can be referenced by multiple different variants of the same type of building equipment to facilitate the presentation of data points associated with the building equipment (e.g., via a user interface) in a consistent and user-friendly manner. For example, an equipment definition may specify which data points are displayed via a user interface.

Equipment definitions can be automatically created by abstracting the data points provided by archetypal controllers (e.g., typical or representative controllers) for various types of building equipment. For example, an archetypal controller for a particular VMA (i.e., "VMA-20") may provide data points such as "VMA-20.DPR-POS" (i.e., the damper position of VMA-20) and "VMA-20.SUP-FLOW" (i.e., the supply air flow rate through VMA-20). Equipment-specific data points can be abstracted so that the data points are generally applicable to other equipment of the same type. For example, the equipment-specific data point "VMA-20.DPR-POS" can be abstracted to the data point type "DPR-POS" and the equipment-specific data point "VMA-20.SUP-FLOW" can be abstracted to the data point type "SUP-FLOW."Advantageously, the abstracted data point types included in an equipment definition allow the equipment definition to be applied to multiple different variants of the same type of building equipment (e.g., VMAs from different manufacturers, VMAs having different models or output data formats, etc.).

In some embodiments, an equipment definition specifies a system type (e.g., HVAC, lighting, security, fire, etc.), a system sub-type (e.g., terminal units, air handlers, central plants), and/or data category (e.g., critical, diagnostic, operational) associated with the building equipment to which the definition applies. Building equipment can be filtered by various attributes provided in the equipment definition to facilitate the reporting and management of equipment data from multiple building systems.

Equipment definitions can be used to automatically map data points associated with building equipment to equipment objects (e.g., software defined objects) representing the building equipment and/or building objects representing building zones (e.g., rooms or spaces). For example, an equipment definition may include one or more point definitions. Each point definition may define a data point of a particular type and may include search criteria for automatically discovering and identifying data points that satisfy the point definition. An equipment definition can be applied to multiple pieces of building equipment of the same general type (e.g., multiple different VMA controllers). For example, when an equipment definition is applied to a second VMA controller (e.g., a VMA controller other than the archetypal controller used to generate the equipment definition), the search criteria provided by the point definitions can be used to automatically identify data points provided by the second VMA controller that satisfy each point definition. The identified data points can be automatically mapped to a building object or an equipment object.

In some embodiments, the identified data points can be presented in a consistent and user-friendly manner. For example, the identified data points can be displayed via a user interface using user-friendly labels associated with each point definition (e.g., "Supply Air Temperature") rather than equipment-specific labels that are more difficult to understand (e.g., "VMA-20.SUP-T"). Equipment objects can be associated with each other (e.g., via causal relationships) and/or with building objects (e.g., objects representing building zones) to facilitate various monitoring and control operations performed by the BAS.

In some embodiments, a user interface is provided for automatically creating equipment definitions and using equipment definitions to automatically create equipment objects and building objects. Advantageously, equipment definitions can be created in an automated manner by abstracting the data points provided by an archetypal BAS device of a particular type (e.g., an archetypal controller). For example, a user can select (via the user interface) an archetypal controller for building equipment of a particular type and/or data points associated with the archetypal controller to automatically create an equipment definition based on the archetypal controller. Other controllers of the same general type can be selected via the user interface to automatically map data points associated with the other controllers to equipment objects based on the search criteria included in the equipment definition.

Referring now to FIG. 1, a perspective view of a building 10 is shown, according to an exemplary embodiment. A BAS serves building 10. The BAS for building 10 may include any number or type of devices that serve building 10. For example, each floor may include one or more security devices, video surveillance cameras, fire detectors, smoke detectors, lighting systems, HVAC systems, or other building systems or devices. In modern BASs, BAS devices can exist on different networks within the building (e.g., one or more wireless networks, one or more wired networks, etc.) and yet serve the same building space or control loop. For example, BAS devices may be connected to different communications networks or field controllers even if the devices serve the same area (e.g., floor, conference room, building zone, tenant area, etc.) or purpose (e.g., security, ventilation, cooling, heating, etc.).

BAS devices may collectively or individually be referred to as building equipment. Building equipment may include any number or type of BAS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BAS devices," "BAS device" and "building equipment" are used interchangeably throughout this disclosure.

Figure 2:
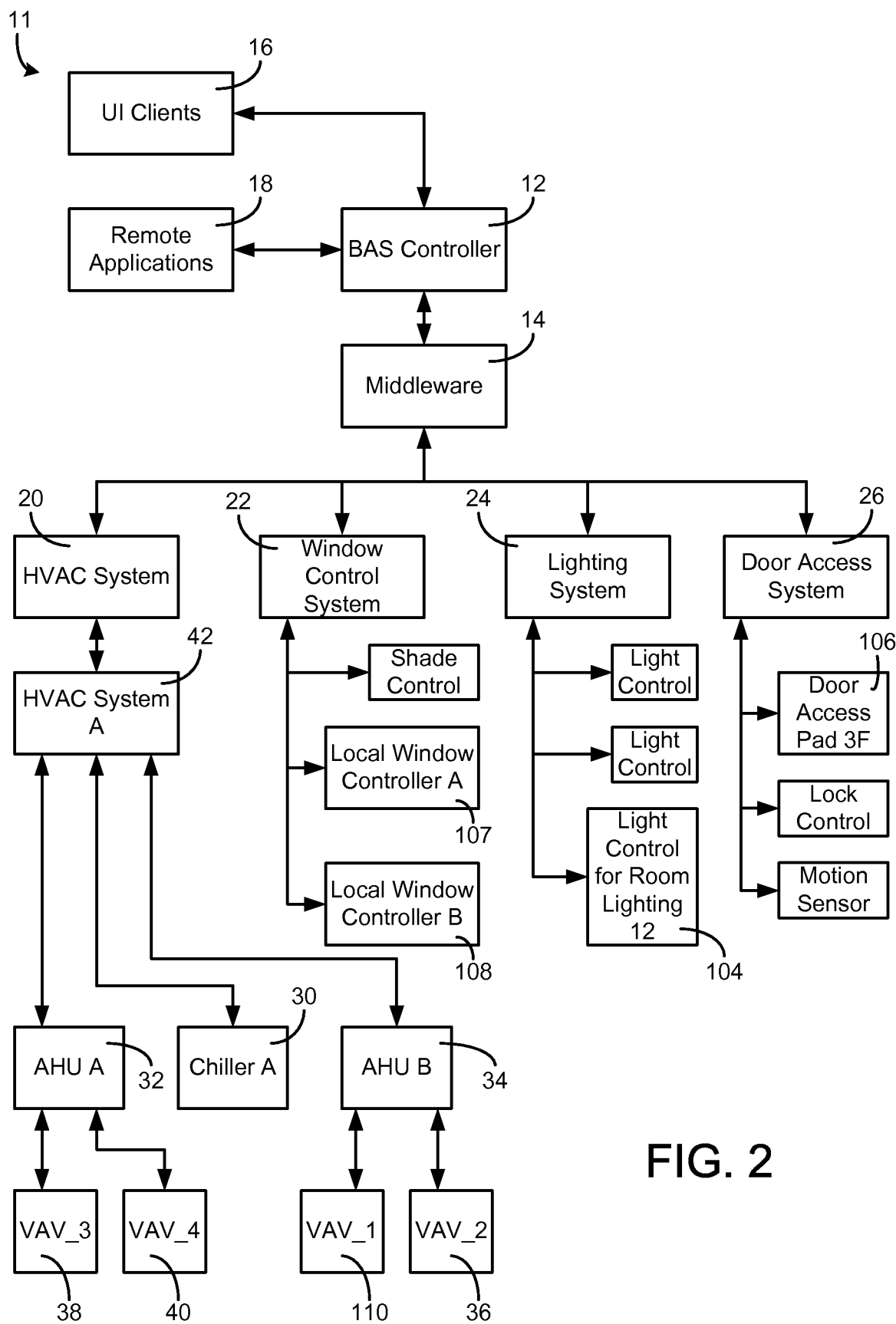
FIG. 2 is a block diagram illustrating the BAS of FIG. 1 in greater detail, showing a BAS controller in communication with several BAS subsystems and a plurality of BAS devices, according to an exemplary embodiment.

Referring now to FIG. 2, a block diagram of a BAS 11 for building 10 is shown, according to an exemplary embodiment. BAS 11 is shown to include a plurality of BAS subsystems 20-26. Each BAS subsystem 20-26 is connected to a plurality of BAS devices and makes data points for varying connected devices available to upstream BAS controller 12. Additionally, BAS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BAS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BAS 11). AHU 32 may serve variable air volume (VAV) boxes 38, 40 (named "VAV_3" and "VAV_4" in BAS 11). Likewise, AHU 34 may serve VAV boxes 36 and 110 (named "VAV_2" and "VAV_1"). HVAC system 42 may also include chiller 30 (named "Chiller A" in BAS 11). Chiller 30 may provide chilled fluid to AHU 32 and/or to AHU 34. HVAC system 42 may receive data (i.e., BAS inputs such as temperature sensor readings, damper positions, temperature setpoints, etc.) from AHUs 32, 34. HVAC system 42 may provide such BAS inputs to HVAC system 20 and on to middleware 14 and BAS controller 12. Similarly, other BAS subsystems may receive inputs from other building devices or objects and provide the received inputs to BAS controller 12 (e.g., via middleware 14).

Middleware 14 may include services that allow interoperable communication to, from, or between disparate BAS subsystems 20-26 of BAS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BAS controller 12, middleware 14 and BAS controller 12 may integrated in some embodiments. For example, middleware 14 may be a part of BAS controller 12.

Still referring to FIG. 2, window control system 22 may receive shade control information from one or more shade controls, ambient light level information from one or more light sensors, and/or other BAS inputs (e.g., sensor information, setpoint information, current state information, etc.) from downstream devices. Window control system 22 may include window controllers 107, 108 (e.g., named "local window controller A" and "local window controller B," respectively, in BAS 11). Window controllers 107, 108 control the operation of subsets of window control system 22. For example, window controller 108 may control window blind or shade operations for a given room, floor, or building in the BAS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BAS subsystems 20-26 may be connected to BAS controller 12 via middleware 14 and may be configured to provide BAS controller 12 with BAS inputs from various BAS subsystems 20-26 and their varying downstream devices. BAS controller 12 may be configured to make differences in building subsystems transparent at the human-machine interface or client interface level (e.g., for connected or hosted user interface (UI) clients 16, remote applications 18, etc.). BAS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
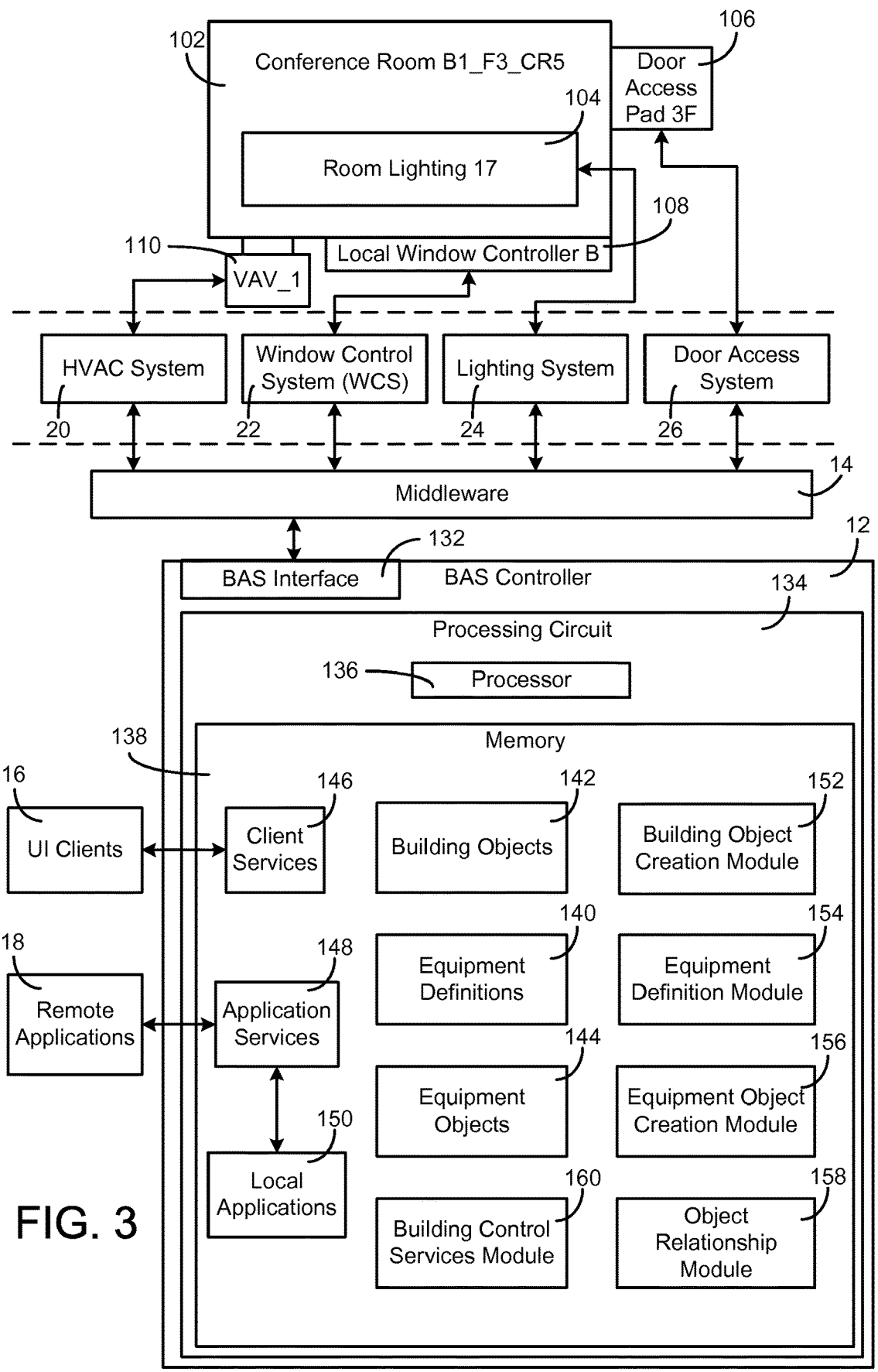
FIG. 3 is a block diagram illustrating the BAS controller of FIG. 2 in greater detail, according to an exemplary embodiment.

Referring now to FIG. 3, a block diagram illustrating a portion of BAS 11 in greater detail is shown, according to an exemplary embodiment. Particularly, FIG. 3 illustrates a portion of BAS 11 that services a conference room 102 of building 10 (named "B1_F3_CR5"). Conference room 102 may be affected by many different building devices connected to many different BAS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BAS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BAS controller 12 is shown to include a BAS interface 132 in communication with middleware 14. In some embodiments, BAS interface 132 is a communications interface. For example, BAS interface 132 may include wired or wireless interfaces (e.g., jacks, antennas, transmitters, receivers, transceivers, wire terminals, etc.) for conducting data communications with various systems, devices, or networks. BAS interface 132 can include an Ethernet card and port for sending and receiving data via an Ethernet-based communications network. In another example, BAS interface 132 includes a WiFi transceiver for communicating via a wireless communications network. BAS interface 132 may be configured to communicate via local area networks or wide area networks (e.g., the Internet, a building WAN, etc.).

In some embodiments, BAS interface 132 and/or middleware 14 includes an application gateway configured to receive input from applications running on client devices. For example, BAS interface 132 and/or middleware 14 may include one or more wireless transceivers (e.g., a WiFi transceiver, a Bluetooth transceiver, a NFC transceiver, a cellular transceiver, etc.) for communicating with client devices. BAS interface 132 may be configured to receive building management inputs from middleware 14 or directly from one or more BAS subsystems 20-26. BAS interface 132 and/or middleware 14 can include any number of software buffers, queues, listeners, filters, translators, or other communications-supporting services.

Still referring to FIG. 3, BAS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BAS controller 12 (and more particularly processing circuit 134) to complete such activities.

Still referring to FIG. 3, memory 138 is shown to include building objects 142. In some embodiments, BAS controller 12 uses building objects 142 to group otherwise ungrouped or unassociated devices so that the group may be addressed or handled by applications together and in a consistent manner (e.g., a single user interface for controlling all of the BAS devices that affect a particular building zone or room). Building objects can apply to spaces of any granularity. For example, a building object can represent an entire building, a floor of a building, or individual rooms on each floor. In some embodiments, BAS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BAS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BAS device, the search criteria specified by the point definitions can be used to automatically identify data points provided by the BAS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below. An example of a user interface for visualizing an equipment definition is described with reference to FIG. 12.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BAS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BAS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BAS device to the attributes of the equipment object. The creation of equipment objects is described in greater detail below with reference to equipment object creation module 156. An example of a user interface for creating equipment objects is described with reference to FIGS. 15-18.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158. An example of a user interface for establishing relationships between objects is described with reference to FIGS. 25-26.

Still referring to FIG. 3, memory 138 is shown to include client services 146 and application services 148. Client services 146 may be configured to facilitate interaction and/or communication between BAS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BAS, automated fault detection and diagnostics systems, etc.). Application services 148 may facilitate direct or indirect communications between remote applications 18, local applications 150, and BAS controller 12. For example, application services 148 may allow BAS controller 12 to communicate (e.g., over a communications network) with remote applications 18 running on mobile devices and/or with other BAS controllers.

In some embodiments, application services 148 facilitate an applications gateway for conducting electronic data communications with UI clients 16 and/or remote applications 18. For example, application services 148 may be configured to receive communications from mobile devices and/or BAS devices. Client services 146 may provide client devices with a graphical user interface that consumes data points and/or display data defined by equipment definitions 140 and mapped by equipment objects 144. Various user interfaces provided by client services 146 are described in greater detail with reference to FIGS. 5-35.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BAS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BAS 11 to define the spaces within building 10. For example, BAS 11 may provide a listing of controllers for building 10 (e.g., as part of a network of data points) that have the physical location (e.g., room name) of the controller in the name of the controller itself. Building object creation module 152 may extract room names from the names of BAS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BAS 11. The network of data points may be a hierarchical representation of data points that are measured, calculated, or otherwise obtained by various BAS devices. BAS devices may be represented in the network of data points as nodes of the hierarchical representation with associated data points depending from each BAS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through VMA. The labels generated by equipment definition module 154 may be displayed in conjunction with data values from BAS devices as part of a user-friendly interface.

In some embodiments, equipment definition module 154 generates search criteria for each point definition. The search criteria may include one or more parameters for identifying another data point (e.g., a data point associated with another controller of BAS 11 for the same type of building equipment) that represents the same variable as the point definition. Search criteria may include, for example, an instance number of the data point, a network address of the data point, and/or a network point type of the data point.

In some embodiments, search criteria includes a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BAS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BAS devices of the particular type and provides search criteria for identifying the attribute among other data points provided by such BAS devices.

In some embodiments, the equipment definition created by equipment definition module 154 includes an indication of display data for BAS devices that reference the equipment definition. Display data may define one or more data points of the BAS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions. An example of a graphical user interface for visualizing equipment definitions is described in greater detail with reference to FIG. 12.

Equipment definition module 154 may generate an equipment definition for each different type of building equipment in BAS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BAS devices. In some embodiments, equipment object creation module 156 creates an equipment object by applying an equipment definition to the data points provided by a BAS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BAS device used to create the equipment object. For example, if the BAS device is a VMA, equipment object creation module 156 may retrieve the equipment definition for VMAs; whereas if the BAS device is a chiller, equipment object creation module 156 may retrieve the equipment definition for chillers. The type of BAS device to which an equipment definition applies may be stored as an attribute of the equipment definition. Equipment object creation module 156 may identify the type of BAS device being used to create the equipment object and retrieve the corresponding equipment definition from the data storage device.

In other embodiments, equipment object creation module 156 receives an equipment definition prior to selecting a BAS device. Equipment object creation module 156 may identify a BAS device of BAS 11 to which the equipment definition applies. For example, equipment object creation module 156 may identify a BAS device that is of the same type of building equipment as the archetypal BAS device used to generate the equipment definition. In various embodiments, the BAS device used to generate the equipment object may be selected automatically (e.g., by equipment object creation module 156), manually (e.g., by a user) or semi-automatically (e.g., by a user in response to an automated prompt from equipment object creation module 156). An example user interface for creating building objects is described in greater detail with reference to FIGS. 15-18.

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points. An example of such an equipment discovery table is described in greater detail with reference to FIG. 16.

Equipment object creation module 156 may use the equipment definition to automatically identify one or more data points of the selected BAS device to map to the columns of the equipment discovery table. Equipment object creation module 156 may search for data points of the BAS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BAS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BAS device to the equipment discovery table. A data point of the selected BAS device may be mapped to a column of the equipment discovery table in response to a determination by equipment object creation module 156 that the data point satisfies the point definition (e.g., the search criteria) used to generate the column. For example, if a data point of the selected BAS device has the name "VMA-18.SUP-FLOW" and a search criterion is the text string "SUP-FLOW," equipment object creation module 156 may determine that the search criterion is met. Accordingly, equipment object creation module 156 may map the data point of the selected BAS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BAS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BAS device to affect another BAS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BAS device represented by the equipment object serves a particular space or BAS device. An example of a user interface for establishing relationships between objects is described in greater detail with reference to FIGS. 25-26.

Still referring to FIG. 3, memory 138 is shown to include a building control services module 160. Building control services module 160 may be configured to automatically control BAS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BAS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BAS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BAS devices to translate an input received from a building system into an output or control signal for the building system. Building control services module 160 may receive location information for BAS devices from location determination module 152. In some embodiments, building control services module 160 automatically sets or recommends control parameters for the BAS devices based on the locations of the BAS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BAS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BAS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
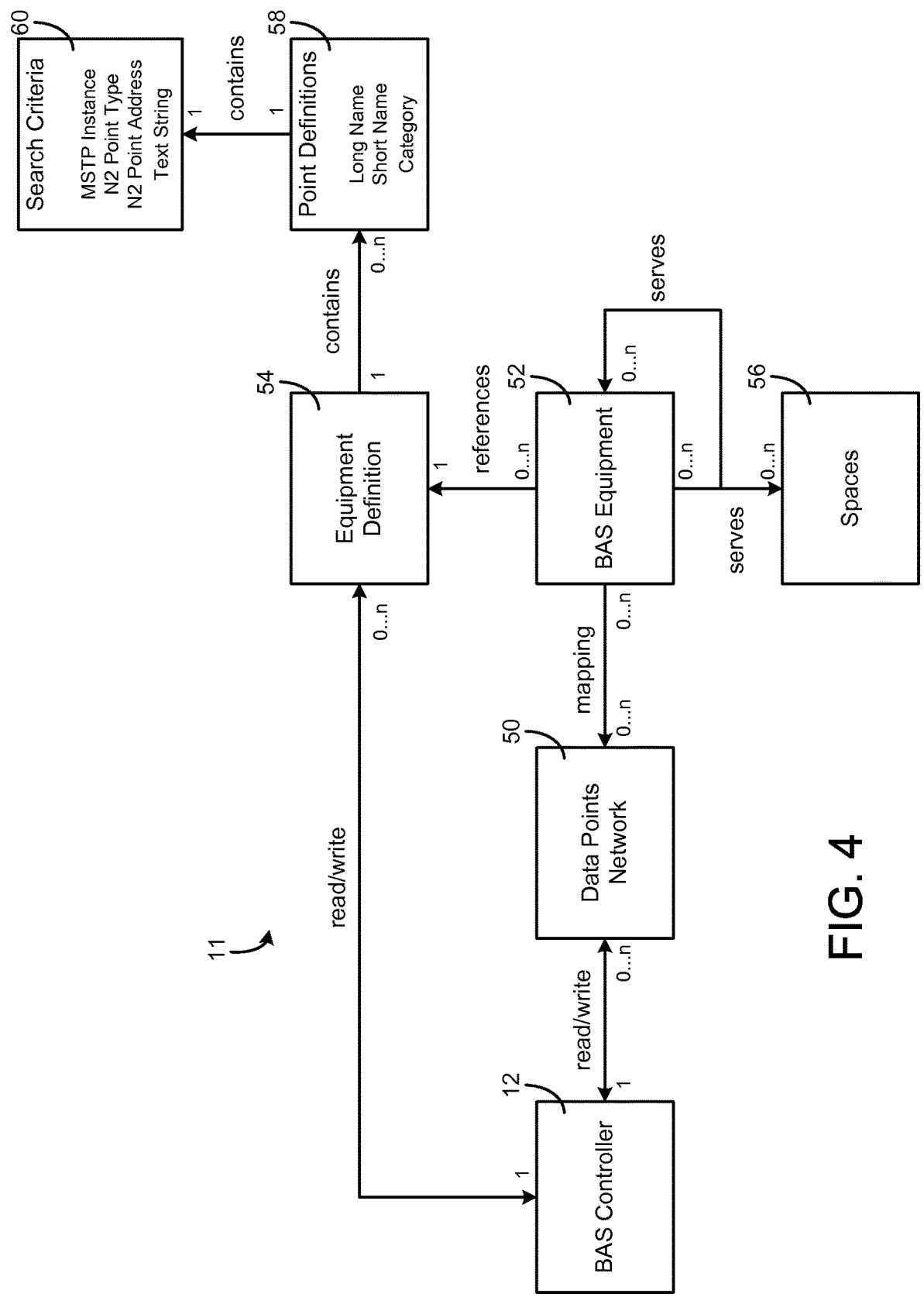
FIG. 4 is a block diagram illustrating logical relationships between the BAS controller of FIG. 2, a data points network, BAS equipment, and an equipment definition referenced by the BAS equipment, according to an exemplary embodiment.

Referring now to FIG. 4, a block diagram illustrating logical relationships between various components of BAS 11 is shown, according to an exemplary embodiment. BAS 11 is shown to include a BAS controller 12 and BAS equipment 52. BAS controller 12 may be the same as previously described with reference to FIGS. 2-3. BAS equipment 52 may include any number or type of BAS devices within or around building 10. For example, BAS equipment 52 may include BAS subsystems, controllers, chillers, rooftop units, fire and security systems, elevator systems, thermostats, lighting, serviceable equipment (e.g., vending machines), terminal units, intermediate systems, central plants, and/or any other type of equipment or system that can be used to control, automate, or otherwise contribute to an environment, state, or condition of building 10.

BAS controller 12 and BAS equipment 52 both interact with data points network 50. Data points network 50 may include a collection of data points that are produced (e.g., measured, calculated, etc.) by BAS equipment 52. Data points network 50 may include any number of data points (0 . . . n). Data values output by BAS equipment 52 may be mapped to various data points of data points network 50. Each BAS device may map data values to any number of data points (0 . . . n). BAS controller 12 may read data points from data points network 50 and/or write data points to data points network 50. For example, BAS controller 12 may read measured values produced by BAS equipment 52 and write setpoint values and/or control signal values.

In various embodiments, data points network 50 organizes data points hierarchically (e.g., in a network tree), by network location, or according to any other logical structure. Data points network 50 may distinguish data points by a reference name, a location (e.g., a network path), and/or a particular BAS device with which the data points are associated. BAS controller 12 may access data points network 50 to identify BAS equipment 52 and to identify data points associated with particular BAS devices. For example, BAS controller 12 may access data points network 50 to identify data points that are associated with a particular controller.

Still referring to FIG. 4, BAS equipment 52 is shown serving spaces 56. Spaces 56 may be rooms, floors, zones, buildings, or other physical spaces. Any quantity of BAS equipment 52 (0 . . . n) may serve any number of spaces 56. For example, a single upstream unit (e.g., a chiller, an AHU, etc.) may serve multiple different spaces 56, whereas a terminal unit (e.g., a VMA, a VAV box, etc.) may serve a single space 56. BAS equipment 52 can also serve other BAS equipment 52. For example, a chiller can serve an AHU, which can serve one or more VAV boxes.

Relationships between BAS equipment 52 and the spaces served by such BAS equipment may be indicated by the names and/or network locations of the data points associated with BAS equipment 52. For example, a data value output by a BAS device may be mapped to a data point with the name or network address including the text string "Building1.Floor4.Room4" indicating that that the data point is produced by a device serving Room 4 on Floor 4 of Building 1. In some embodiments, BAS controller 12 accesses data points network 50 to automatically determine relationships between building equipment 52 and spaces 56. Relationships between building equipment 52 and other building equipment 52 and/or spaces 56 can be established automatically or in a drag-and-drop fashion, as described in greater detail with reference to FIGS. 25-26.

Still referring to FIG. 4, BAS controller 12 is shown reading and writing equipment definitions 54. As described with reference to FIG. 3, BAS controller may create equipment definitions 54 based on the data points associated with archetypal controllers (e.g., as indicated by data points network 50) for BAS equipment 52 of various types. BAS controller 12 may use equipment definitions 54 to automatically create equipment objects. BAS controller 12 may apply equipment definitions 54 to a set of data points associated with various controllers (e.g., as indicated by data points network 50) to automatically map data points from data points network 50 to attributes of the created equipment objects.

BAS equipment 52 is shown referencing an equipment definition 54. Each equipment definition 54 may apply to any number of BAS equipment 52 (0 . . . n) of the same general type. For example, the same equipment definition may apply to multiple different VMAs. Each equipment definition 54 may contain any number (0 . . . n) of point definitions 58. Point definitions 58 may define a long name (e.g., a user-friendly descriptive name), a short name (e.g., a shortened version of the long name), and/or a category for a particular type of data point. BAS controller 12 may use point definitions 58 to define the columns of the equipment discovery table.

Each point definition 58 may include search criteria for identifying data points of a particular type. Search criteria 60 may include, for example, an MSTP instance number, an N2 point type, an N2 point address, and/or a text string. BAS controller 12 may use search criteria 60 to identify data points (e.g., from data points network 50) to which a point definition applies. BAS controller may map a data point to a column of the equipment discovery table in response to a determination that the data point satisfies the search criteria 60 contained by the point definition 58 which defines the column.

Referring now to FIGS. 5-8, a user interface 500 for creating building objects is shown, according to an exemplary embodiment. User interface 500 may facilitate the creation hierarchical building objects (i.e., software objects representing spaces within a building or complex) and may be referred to as a spaces tree editor. As shown in FIG. 5, building objects can be created by selecting "new space" icon 502 via user interface 500. Spaces within other spaces may be represented by hierarchical building objects in user interface 500. For example, user interface 500 is shown to include a spaces tree 504 which includes a "complex" level 516, a "building" level 518 below complex level 516, and a "floor" level 520 below building level 518. In some embodiments, spaces tree 504 includes a "room" or "zone" level below floor level 520. A user can interact with user interface 500 to create new building objects at any hierarchical level.

As shown in FIG. 6, user interface 500 may include interface options for defining spaces (e.g., newly-created spaces, existing spaces, etc.). For example, spaces can be assigned a name attribute 506 (e.g., "Complex"), a description attribute 508, a system category attribute 510, and/or a type attribute 512 (e.g., complex, building, floor, room, etc.). A user can enter data into value fields 516 to define values for attributes 506-512. Spaces can be associated with BAS equipment serving the space by selecting BAS equipment via "equipment serving" field 514.

Building objects can be defined in an automated or semi-automated fashion by importing spaces data. As shown in FIG. 7, spaces data can be dragged and dropped into spaces tree 504 to automatically create room building objects within each floor building object. As shown in FIG. 8, spaces data can be imported from a table to automatically define building objects. The building objects created via user interface 500 may be stored in building objects 142.

Referring now to FIGS. 9-12, a user interface 900 for creating equipment definitions is shown, according to an exemplary embodiment. Referring specifically to FIG. 9, a new equipment definition can be created for building equipment of a particular type. The type of building equipment to which the equipment definition applies can be defined via user interface 900. For example, the equipment definition can be assigned a name attribute 902 (e.g., "Building X VAV Boxes") and/or description attribute 904 describing the type of building equipment defined by the equipment definition.

Advantageously, the building equipment to which the equipment definition applies can be classified by selecting a system category 906 (e.g., HVAC, lighting, security, water, etc.) via dropdown box 908. System category 906 can be used as an attribute for filtering equipment objects and the data points associated therewith. In some embodiments, equipment definitions can be further classified by subtype 910 (e.g., terminal units, air handlers, central plants) via dropdown box 912 and/or by ID set 914 (e.g., critical, diagnostic, operational, etc.) via dropdown box 916. Filtering by system and data category may be useful in managing data from multiple building systems.

Referring specifically to FIG. 10, creating the equipment definition may include identifying an archetypal BAS device for the type of building equipment to which the equipment definition will apply. An archetypal BAS device may be a typical or representative BAS device defined by the equipment definition. In some embodiments, identifying an archetypal BAS device includes selecting an archetypal BAS device via data points network 1000. Data points network 1000 may be the same or similar to data points network 50, described with reference to FIG. 4. For example, data points network 1000 is shown to include a VMA controller 1002 (i.e., "VMA-20") and a plurality of data points 1004 associated with VMA controller 1002. Although only one BAS device is shown in FIG. 10, it is understood that data points network 1000 may include any number of BAS devices.

Referring specifically to FIG. 11, an interface 1100 for visualizing data points network 1000 is shown, according to an exemplary embodiment. Each data point in data points network 1000 may include one or more attributes 1102 and associated values 1104. Both of the data points shown in FIG. 11 are N2 data points and are shown to include the attributes "net point type" 1108 and "net point address" 1110. Other data point attributes 1102 may include, for example, a data point name 1106 (e.g., "VMA-20.OCC-C," "4800.4818-T," etc.), an instance value (e.g., if the data point is an MSTP data point), and/or any other attributes of a data point that may be useful for classifying or describing the source or type of data associated with data points 1004.

It should be noted that data point attributes 1102 may include a reference attribute 1112 identifying a particular BAS device and/or data output of the BAS device to which the corresponding data point is mapped. Although reference attribute 1112 is not required for creating equipment definitions, reference attribute 1112 may be useful in mapping attributes of equipment objects to the data values referenced by data points 1004 (described in greater detail with reference to FIGS. 19-21).

Referring specifically to FIG. 12, a user interface 1200 for creating and visualizing an equipment definition is shown, according to an exemplary embodiment. User interface 1200 is shown to include a point definition portion 1202 and a display data portion 1204. Point definition portion 1202 is shown to include a plurality of point definitions 1206. Each point definition 1206 is represented by a row in point definition portion 1202. Point definitions 1206 may be the same or similar to point definitions 58, described with reference to FIG. 4. For example, each point definition 1206 is shown to include a label 1208 (e.g., a description of the type of data point defined by the point definition), a short name 1210 (e.g., an abbreviation for label 208), a category 1212 (e.g., generic), a source attribute 1214 (e.g., present value), and search criteria 1224. Search criteria 1224 may include one or more attributes that define data points to which the point definition applies. For example, search criteria 1224 are shown to include an instance attribute 1216, a net point address attribute 1218, a net point type attribute 1220, and a text string 1222.

Advantageously, point definitions 1206 may be generated automatically (e.g., by equipment definition module 154) from data points 1004 associated with the archetypal BAS device. For example, data points 1004 can be dragged and dropped into point definition portion 1202. In other embodiments, equipment definition module 154 automatically identifies data points 1004 and imports data points 1004 without requiring user action or intervention. Attributes of data points 1004 (defined by data points network 1000) are used to populate values for attributes 1208-1222 of point definitions 1206. For example, the value of net point type attribute 1108 (e.g., ADI, AI, etc.) obtained from data points network 1000 may be used as the value for net point type attribute 1220. The value of net point address attribute 1110 obtained from data points network 1000 (e.g., 165, 4, etc.) may be used as the value for net point address attribute 1218.

In some embodiments, name attribute 1106 abstracted to generate short name attribute 1210 and/or text string 1222. For example, the name attribute 1106 "VMA-20.OCC-C" may be abstracted to generate the short name attribute 1210 "OCC-C" and text string 1222 "*OCC-C*" where the "*" characters are wildcards. Advantageously, abstracted attributes 1210 and 1222 may be applicable to multiple different variants of the same type of building equipment (e.g., VMAs from different manufacturers, VMAs having different models or output data formats, etc.), thereby facilitating broad application of the equipment definition.

Label attribute 1208 may be a user-friendly label for each point definition 1206. The user-friendly label may be a plain text description of the variable defined by the point definition. For example, the label "Supply Air Flow" indicates that the data point corresponding to the point definition represents a supply air flow rate through the VMA. The values of label attribute 1208 may be displayed in conjunction with data values from BAS devices as part of a user-friendly interface.

Still referring to FIG. 12, point definition portion 1202 is shown to include a display data input 1226. Display data input 1226 is configured to receive a user selection of one or more point definitions 1206 as display data. For example, a user may check a checkbox in the row for a point definition to indicate a user selection of the point definition as display data. Display data portion 1204 is shown to include an indication of the point definitions that have been marked as display data in point definition portion 1202. In some embodiments, display data portion 1204 includes the label 1208 and short name 1210 for each selected point definition. Display data portion 1204 may define one or more data points that will be displayed via a user interface.

In some embodiments, the display priority of display data 1204 can be adjusted via order adjustment inputs 1228. For example, a user can select order adjustment inputs 1228 to move an item of display data 1204 up or down in the list. The display priority of display data 1204 determines which data points represented by display data 1204 will be displayed when not all of the selected data points can be shown (e.g., for user interfaces that display only a few items of display data 1204).

Figure 13:
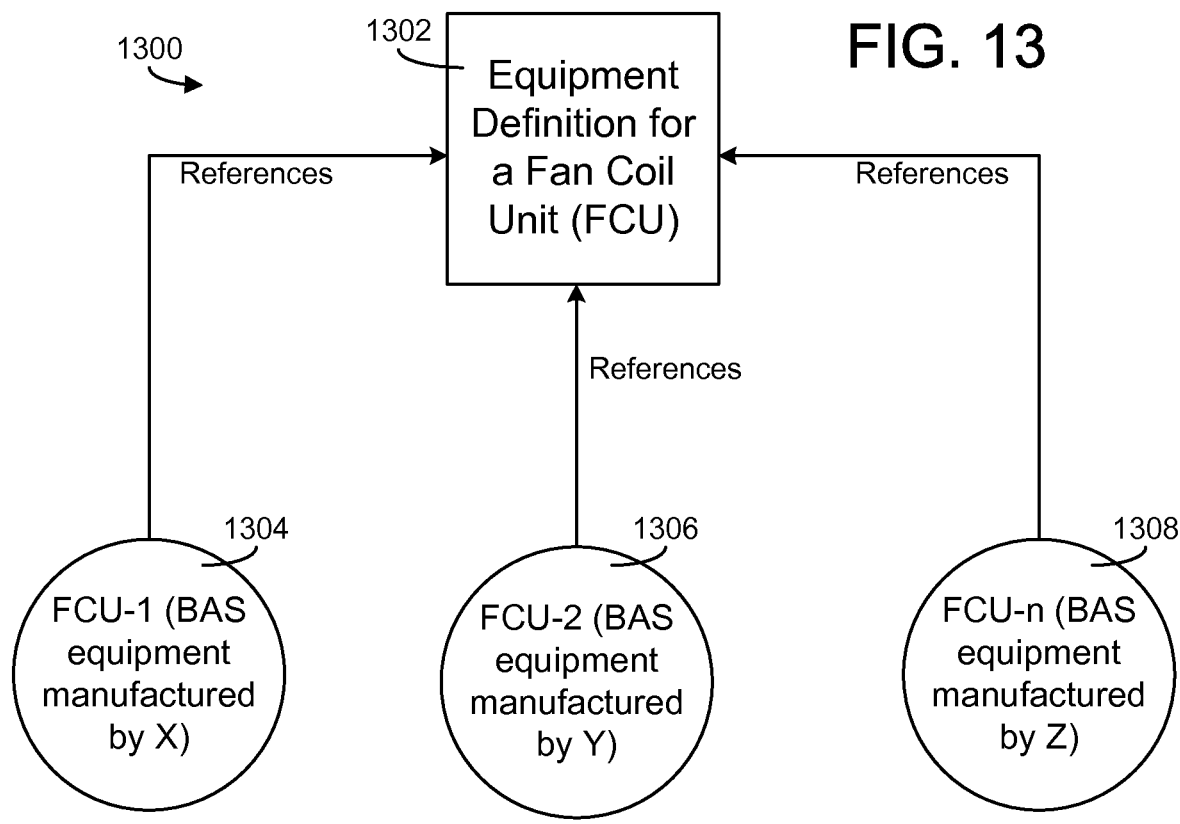
FIGS. 13-14 are block diagrams illustrating the applicability of equipment definitions to many different BAS devices of the same general type, according to an exemplary embodiment.
Figure 14:
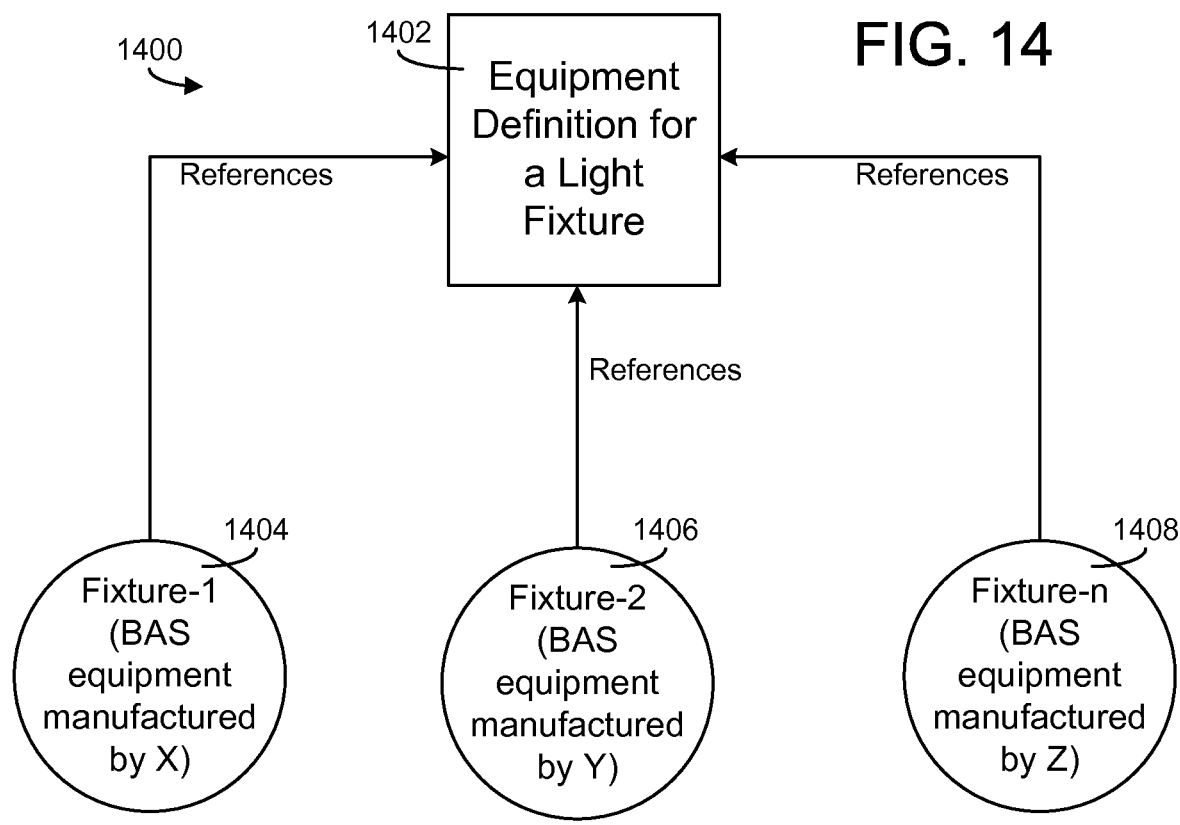

Referring now to FIGS. 13-14, two block diagrams 1300 and 1400 illustrating the applicability of equipment definitions to a variety of different BAS equipment are shown, according to an exemplary embodiment. Referring specifically to FIG. 13, an equipment definition 1302 for a fan coil unit (FCU) can be referenced by multiple different FCUs. For example, equipment definition 1302 can be referenced by a first FCU 1304 (i.e., "FCU-1") manufactured by a first manufacturer (i.e., "manufacturer X"), a second FCU 1306 (i.e., "FCU-2") manufactured by a second manufacturer (i.e., "manufacturer Y"), and a nth FCU 1308 (i.e., "FCU-n") manufactured by a nth manufacturer (i.e., "manufacturer Z"). FCUs 1304-1308 may vary with respect to equipment vendor, model, version manufacturer, and/or other factors. Advantageously, each of FCUs 1304-1308 can reference the same equipment definition 1302, regardless of equipment-specific variations, due to the abstraction of data points used to generate equipment definition 1302.

Referring specifically to FIG. 14, an equipment definition 1402 for a lighting fixture can be referenced by multiple different lighting fixtures. For example, equipment definition 1402 can be referenced by a first lighting fixture 1404 (i.e., "Fixture-1") manufactured by a first manufacturer (i.e., "manufacturer X"), a second lighting fixture 1406 (i.e., "Fixture-2") manufactured by a second manufacturer (i.e., "manufacturer Y"), and a nth lighting fixture 1408 (i.e., "Fixture-n") manufactured by a nth manufacturer (i.e., "manufacturer Z"). Lighting fixtures 1404-1408 may vary with respect to equipment vendor, model, version manufacturer, and/or other factors. Advantageously, each of lighting fixtures 1404-1408 can reference the same equipment definition 1402, regardless of equipment-specific variations, due to the abstraction of data points used to generate equipment definition 1402. Equipment definitions can be created for any type of BAS equipment on any level within BAS 11.

Figure 15:
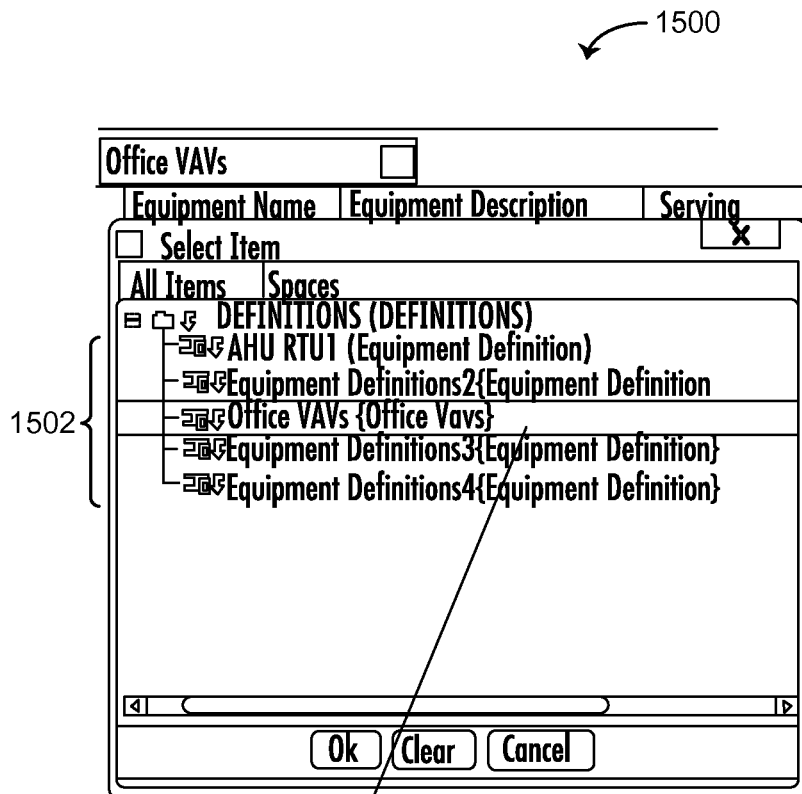
FIG. 15 is a drawing of a user interface for initiating the creation of equipment objects representing BAS devices based on a selected equipment definition, according to an exemplary embodiment.

Referring now to FIGS. 15-18, a user interface 1500 for creating equipment objects is shown, according to an exemplary embodiment. User interface 1500 may be generated by equipment object creation module 156 to guide a user through the process of creating equipment objects (for embodiments in which equipment object creation is not fully automated). Referring specifically to FIG. 15, a list of equipment definitions 1502 is shown. User interface 1500 may access the data storage device in which equipment definitions 1502 are stored (e.g., memory 138, equipment definitions 140, etc.) and provide a visualization of available equipment definitions 1502. A user can select one or more of equipment definitions 1502 via user interface 1500.

Figure 16:
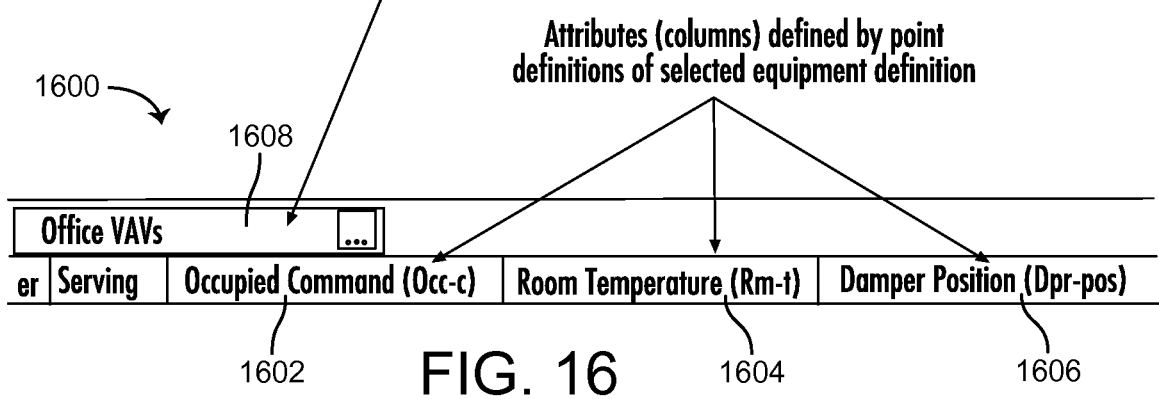
FIG. 16 is a drawing of an equipment discovery table used in the creation of equipment objects, each column of the equipment discovery table corresponding to a point definition of the selected equipment definition, according to an exemplary embodiment.

Referring specifically to FIG. 16, an equipment discovery table 1600 may be created (e.g., by equipment object creation module 156) based on the selected equipment definition. Equipment discovery table 1600 is shown to include columns 1602, 1604, and 1616. Each of columns 1602-1606 may be defined by the point definitions of the selected equipment definition. For example, if the selected equipment definition includes point definitions for the data points "Occupied Command," "Room Temperature," and "Damper Position," equipment discovery table 1600 may include columns for each of the defined data points. In some embodiments, each of columns 1602-1606 includes the label (e.g., label 1208) and short name (e.g., short name 1210) for the corresponding point definition. In some embodiments, equipment discovery table 1600 includes an indication 1608 of the equipment definition used to generate the equipment discovery table.

As shown in FIG. 16, equipment discovery table 1600 has not been mapped to any particular data points. Thus, the values for columns 1602-1606 in FIG. 16 are not yet defined. Although only three columns are shown in FIG. 16, it is understood that equipment discovery table 1600 can have any number of columns. For example, if the selected equipment definition has a greater number of point definitions, equipment discovery table 1600 may have a greater number of columns.

Referring specifically to FIGS. 17-18, equipment discovery table 1600 is shown to include a plurality of columns 1602-1616. In addition to columns 1602-1606 (described with reference to FIG. 16), equipment discovery table 1600 is shown to include a "Box Heating Valve Command" column 1608, a "Radiant Heating Valve Command" column 1610, a "Supply Air Flow" column 1612, a "Supply Air Flow Setpoint" column 1614, and a "Room Temperature Setpoint" column 1616. Each of columns 1602-1616 may correspond to a point definition of the selected equipment definition.

Advantageously, the data point mappings for columns 1602-1616 can be automatically populated for various BAS devices. For example, a user can drag and drop BAS devices 1702 from BAS network tree 1700 into equipment discovery table 1600. Each of BAS devices 1702 is shown as a separate row in FIG. 18. Columns 1602-1616 may be automatically mapped to a particular data point for each of BAS devices 1702 based on the equipment definition used to generate equipment discovery table 1600. The automated mapping of data points to columns of the equipment discovery table is described in greater detail with reference to FIGS. 19-22.

Referring now to FIGS. 19-21, an illustration of a process for automatically mapping data points to columns of an equipment discovery table is shown, according to an exemplary embodiment. The illustrated process may be performed in response to a user dragging and dropping BAS devices into an equipment discovery table or automatically (e.g., without requiring user action). Referring specifically to FIG. 20, equipment object creation module 156 may access data points network 1000 to identify all of the data points 1012 associated with each BAS device for which an equipment object will be generated. For example, to generate an equipment object for the BAS device "VMA-33," all of the data points 1012 associated with VMA-33 may be identified.

If multiple equipment objects will be generated (e.g., if a user drags multiple BAS devices into the equipment discovery table), equipment object creation module 156 data points may identify a list of data points associated with each BAS device for which an equipment object will be generated.

Referring specifically to FIG. 19, an equipment definition 1900 having three point definitions 1906 is shown, according to an exemplary embodiment. Each of point definitions 1906 includes search criteria 1908. For the illustration shown in FIGS. 19-21, it is assumed that equipment definition 1900 was used to generate the equipment discovery table. Equipment object creation module 156 accesses equipment definition 1900 to identify the search criteria 1908 for each of point definitions 1906.

Equipment object creation module 156 uses search criteria 1908 to identify data points for BAS devices that satisfy point definitions 1906. For example, equipment object creation module 156 may search the attributes of data points 1012 for values that match one or more of search criteria 1908. In some embodiments, equipment object creation module 156 performs an iterative process for each BAS device and each point definition (described in greater detail with reference to FIG. 22). For example, equipment object creation module 156 may use the search criteria 1908 corresponding to a first point definition 1906 (e.g., "zone temperature") to determine whether any of data points 1012 satisfy the first point definition. As shown in FIG. 20, data point 1008 satisfies the search criteria "*-T*" for the zone temperature point definition 1910. In response to a determination that a data point satisfies the search criteria for a point definition, equipment object creation module 156 may automatically map the data point to a column of the equipment discovery table associated with the point definition.

Referring particularly to FIG. 21, an equipment object 2100 is shown, according to an exemplary embodiment. Equipment object 2100 has attributes that correspond to point definitions 1906. For example, equipment object 2100 is shown to include a zone temperature attribute 2102 corresponding to zone temperature point definition 1910, an occupancy attribute 2104 corresponding to occupancy point definition 1912, and a zone temperature setpoint attribute 2106 corresponding to zone temperature setpoint point definition 1914. Each of attributes 2102-2106 is mapped to a data point identified using the search criteria of the corresponding point definition. As shown in FIG. 21, occupancy data point 1006 is mapped to occupancy attribute 2104, zone temperature data point 1008 is mapped to zone temperature attribute 2102, and zone temperature setpoint data point 1010 is mapped to zone temperature setpoint attribute 2106.

Figure 22:
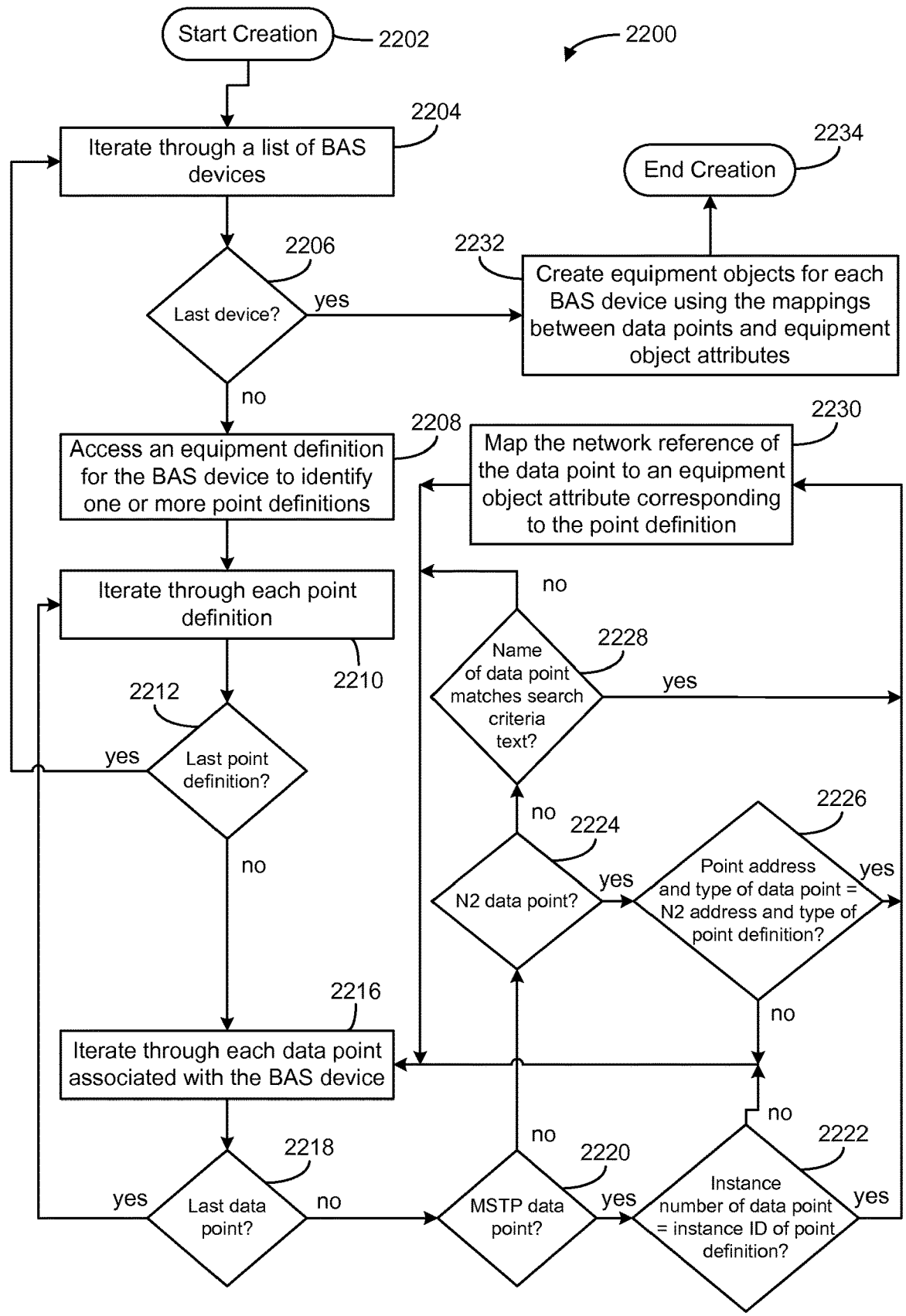
FIG. 22 is a flowchart illustrating an iterative process for using an equipment definition to identify data points of various BAS devices and mapping the identified data points to an equipment object, according to an exemplary embodiment.

Referring now to FIG. 22, a flowchart of an process 2200 for automatically mapping data points to attributes of an equipment object is shown, according to an exemplary embodiment. Process 2200 may be performed by equipment object creation module 156 as described with reference to FIG. 4. As shown in FIG. 22, process 2200 may be an iterative process. For example, process 2200 may begin (step 2202) with equipment object creation module 156 receiving a request to create equipment objects for multiple BAS devices (e.g., in response to a user dragging and dropping multiple BAS devices into an equipment discovery table).

Process 2200 is shown to include iterating through a list of BAS devices (step 2204). The list of BAS devices may be a user defined list (e.g., a user selection of devices) or an automatically defined list (e.g., all BAS devices of a particular type). Each iteration of step 2204 may include determining whether the last BAS device in the list has been fully processed (step 2206). If the last BAS device has not yet been fully processed (i.e., the result of step 2206=no), process 2200 is shown to include accessing an equipment definition for the BAS device of the current iteration (e.g., the equipment definition used to generate the equipment discovery table) to identify one or more point definitions (step 2208).

Process 2200 is shown to include iterating through each point definition identified in step 2208 (step 2210). Each iteration of step 2210 may include determining whether the last point definition in the list has been fully processed (step 2212). If the last point definition has not yet been fully processed (i.e., the result of step 2212=no), process 2200 is shown to include iterating through each data point associated with the BAS device (step 2216). The data points associated with the BAS device may be determined by accessing the data point network. Each iteration of step 2216 may include determining whether the last data point associated with the BAS device has been fully processed (step 2218).

If the last data point for the BAS device has not yet been fully processed (i.e., the result of step 2218=no), process 2200 is shown to include determining whether the data point is a MSTP data point (step 2220). If the data point is a MSTP data point (i.e., the result of step 2220=yes), process 2200 is shown to include determining whether the instance number of the data point matches the instance ID of the point definition (step 2222). If the instance number of the data point matches the instance ID of the point definition (i.e., the result of step 2222=yes), process 2200 is shown to include mapping the network reference of the data point to an equipment object attribute corresponding to the point definition (step 2230) and proceeding to the next data point iteration (step 2216). If the instance number of the data point does not match the instance ID of the point definition (i.e., the result of step 2222=no), process 2200 is shown to include proceeding to the next data point iteration (step 2216) without mapping the data point to the attribute of the equipment object.

If the data point is not a MSTP data point (i.e., the result of step 2220=no), process 2200 is shown to include determining whether the data point is a N2 data point (step 2224). If the data point is a N2 data point (i.e., the result of step 2224=yes), process 2200 is shown to include determining whether the point address and type of the data point match the N2 address and type of the point definition (step 2226). If the point address and type of the data point match the N2 address and type of the point definition (i.e., the result of step 2226=yes), process 2200 is shown to include mapping the network reference of the data point to an equipment object attribute corresponding to the point definition (step 2230) and proceeding to the next data point iteration (step 2216). If the point address and type of the data point do not match the N2 address and type of the point definition (i.e., the result of step 2226=no), process 2200 is shown to include proceeding to the next data point iteration (step 2216) without mapping the data point to the attribute of the equipment object.

If the point address and type of the data point does not match the N2 address and type of the point definition (i.e., the result of step 2224=no), process 2200 is shown to include determining whether the name of the data point matches the search criteria text (step 2228). If the name of the data point matches the search criteria text (i.e., the result of step 2228=yes), process 2200 is shown to include mapping the network reference of the data point to an equipment object attribute corresponding to the point definition (step 2230) and proceeding to the next data point iteration (step 2216). If the name of the data point does not match the search criteria text (i.e., the result of step 2228=no), process 2200 is shown to include proceeding to the next data point iteration (step 2216) without mapping the data point to the attribute of the equipment object.

Still referring to FIG. 22, once all of the data points have been processed (i.e., the result of step 2216=yes), process 2200 is shown to include proceeding to the next point definition iteration (step 2210). Process 2200 may include repeating steps 2216-2230 for each point definition iteration. Once all of the point definitions have been processed for each data point iteration (i.e., the result of step 2212=yes), process 2200 is shown to include proceeding to the next BAS device iteration (step 2204). Process 2200 may include repeating steps 2206-2230 for each BAS device iteration.

Once all of the BAS devices have been processed for each point definition iteration and each data point iteration (i.e., the result of step 2206=yes), process 2200 is shown to include creating equipment objects for each BAS device using the mappings between data points and equipment object attributes established in step 2230. Process 2200 then ends and stores the equipment objects in a data storage device (step 2234).

Referring now to FIG. 23, an equipment object 2300 created using process 2200 is shown, according to an exemplary embodiment. Equipment object 2300 has attributes 2302, 2304, and 2306 that correspond to the point definitions of the equipment definition used to create equipment object 2300. Advantageously, attributes 2302-2306 may be consistent across multiple equipment objects generated using the same equipment definition. This consistency results from the same equipment definition being used to create multiple equipment objects for the same type of BAS device.

Each of attributes 2302-2306 is mapped to a data point identified using the search criteria of the corresponding point definition. For example, attribute 2302 is mapped to reference 2308, attribute 2304 is mapped to reference 2310, and attribute 2306 is mapped to reference 2312. The mappings shown in FIG. 2300 are determined automatically (e.g., by equipment object creation module 156) by identifying the reference values for each data point mapped to an attribute of equipment object 2300. Equipment object creation module 156 may access data points network 1000 to discover mappings between data points and reference values.

Referring now to FIG. 24, a user interface 2400 for visualizing equipment objects is shown, according to an exemplary embodiment. As shown, user interface 2400 consumes various attributes of equipment object 2300. For example, user interface 2400 is shown displaying zone temperature attribute 2302, occupancy attribute 2304, and zone temperature setpoint 2306. User interface 2400 displays attributes of equipment object 2300, which are derived from the equipment definition used to create equipment object 2300. User interface 2400 is shown to include the reference values mapped to each attribute of equipment object 2300. For example, user interface 2400 is shown displaying the value of reference attribute 2308 (i.e., 76.3° F.), the value of reference attribute 2312 (i.e., 73.1° F.), and the value of reference attribute 2310 (i.e., occupied).

Figures 25, 26:
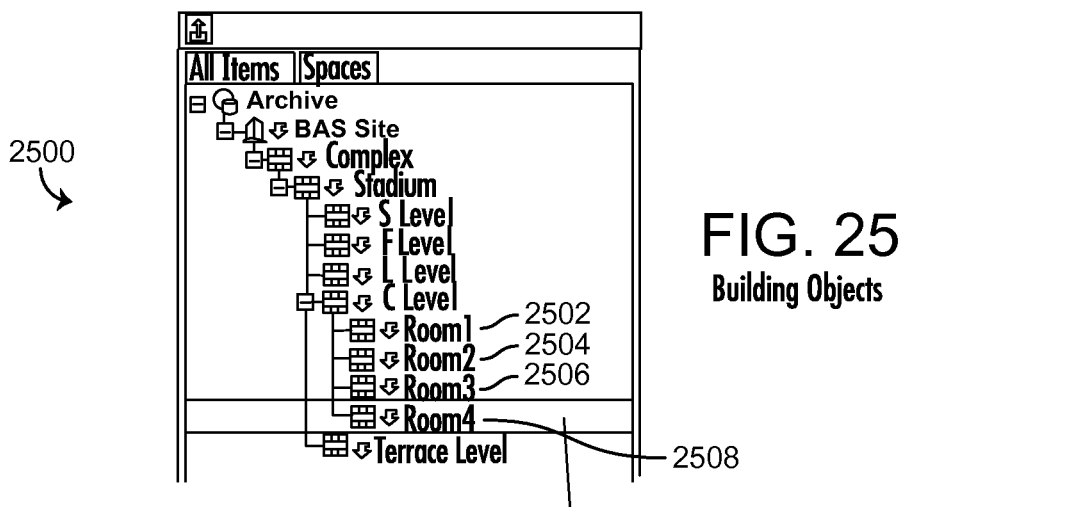
FIGS. 25-26 are drawings illustrating a user interface for associating equipment objects with each other and with building objects, according to an exemplary embodiment.

Referring now to FIGS. 25-26, a user interface 2500 for establishing relationships between building objects and equipment objects is shown, according to an exemplary embodiment. User interface 2500 may be used to associate equipment objects 2602-2608 representing BAS devices with building objects 2502-2508 representing particular rooms or zones. The relationships established via user interface 2500 may indicate that a particular BAS device serves a particular room or zone.

Relationships between building objects 2502-2508 and equipment objects 2602-2608 can be assigned in a "drag and drop" fashion by dragging and dropping a building object 2502-2508 into a "serving" cell 2610-2616 associated with one of equipment objects 2602-2608. As shown in FIG. 26, building object 2502 (i.e., "Room 1") has been associated with equipment object 2602 (i.e., "VMA-11") by dragging and dropping building object 2502 into serving cell 2610. Building object 2504 (i.e., "Room 2") has been associated with equipment object 2604 (i.e., "VMA-12") by dragging and dropping building object 2504 into serving cell 2612. Building object 2506 (i.e., "Room 3") has been associated with equipment object 2606 (i.e., "VMA-13") by dragging and dropping building object 2506 into serving cell 2613. Building object 2508 (i.e., "Room 4") has been associated with equipment object 2608 (i.e., "VMA-14") by dragging and dropping building object 2508 into serving cell 2616.

In some embodiments, user interface 2500 may be used to establish relationships between equipment objects. For example, instead of dragging and dropping a building object into the serving cell associated with an equipment object, another equipment object can be dropped into the serving cell. Relationships between equipment objects may indicate causal relationships between various BAS devices. For example, a causal relationship may be established between a terminal unit (e.g., a VMA) and an upstream unit (e.g., an AHU, a chiller, etc.) which affects an input provided to the terminal unit (e.g., air flow rate, air temperature, etc.). Upstream BAS devices can be associated with downstream BAS devices, which can be associated with spaces. Such a relationship chain allows the various BAS devices serving a particular space to be readily determined.

Advantageously, associating equipment objects with building objects and with each other allows the attributes of equipment objects that serve a space to be mapped to attributes of the building object representing the space. A consistent and user-friendly interface can be provided for monitoring and controlling various spaces, regardless of variations in the BAS devices which serve the spaces.

Referring now to FIGS. 27-32, several user interfaces 2700-3200 for monitoring and controlling BAS devices and spaces are shown, according to an exemplary embodiment. User interfaces 2700-3200 provide a visualization of data points mapped to equipment objects and/or building objects using the systems and methods described with reference to FIGS. 1-26. For example, user interfaces 2700-3200 may display data points that have been mapped to one or more equipment objects that directly serve a space (e.g., equipment objects for terminal units) or indirectly serve a space (e.g., equipment objects for upstream units). User interfaces 2700-3200 illustrate a circle of comfort for maintaining comfortable conditions within a space.

Figure 27:
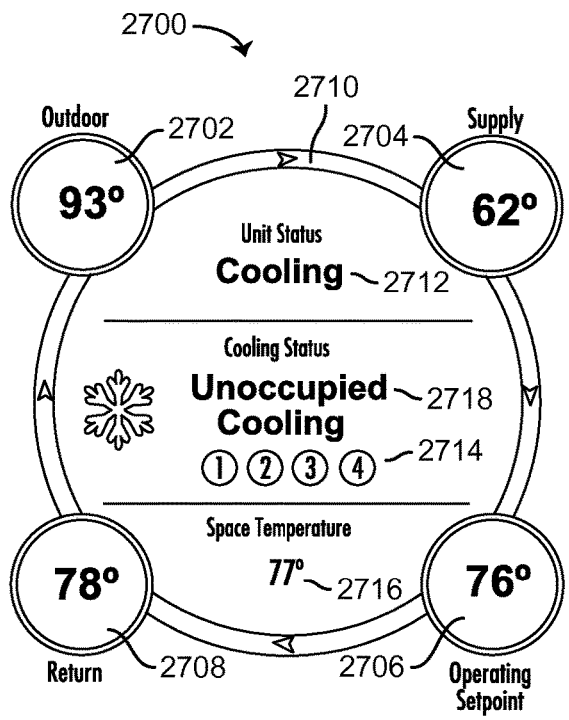
Figure 28:
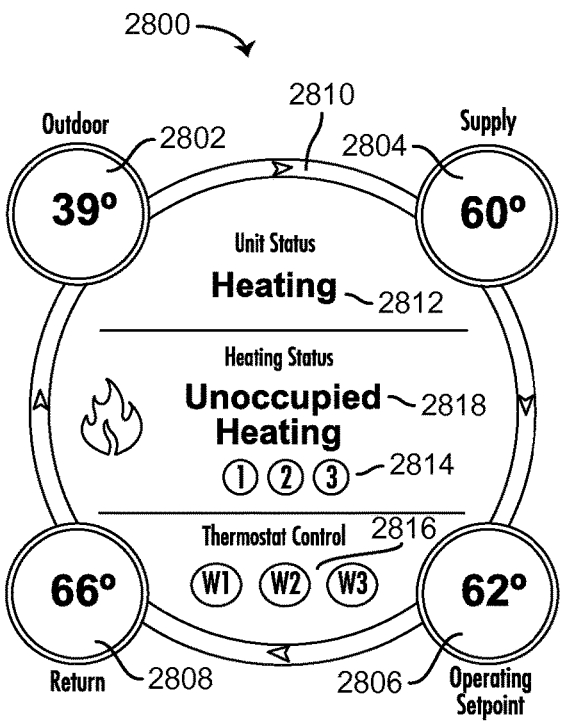

Referring specifically to FIGS. 27-28, user interfaces 2700 and 2800 are shown displaying an outdoor temperature 2702 and 2802, a supply air temperature 2704 and 2804, an operating setpoint 2706 and 2806, and a return air temperature 2708 and 2808. Each of data values 2702-2708 and 2802-2808 may be mapped to an attribute of an equipment object which serves the space. For example, data values 2702-2708 and 2802-2808 may be mapped to user interfaces 2700 and 2800 from data points associated with a rooftop unit that serves the space. An operating status 2712 and 2812 of the rooftop unit (e.g., cooling, heating) is shown in an upper portion of circles 2710 and 2810.

A more detailed status 2714 and 2814 of the current operating state is shown in a middle portion of circles 2710 and 2810. Numbered circles indicate stages of heating or cooling that are available for the rooftop unit. Circles that are filled in (e.g., darkened, colored, etc.) indicate that the corresponding stage is currently powered. Occupancy status indicators 2718 and 2818 provide an indication of the current occupancy status of the space (e.g., occupied, unoccupied). The lower portion of circle 2710 displays the current space temperature. The lower portion of circle 2810 displays thermostat control systems for the space.

Circles 2710 and 2810 indicate a direction of airflow between locations associated with the displayed temperatures. For example, outdoor air is cooled or heated to provide supply air to a space. The supply air helps the space achieve the operating setpoint. Air from within the space is exhausted as return air back to the outdoor location.

Figure 29:
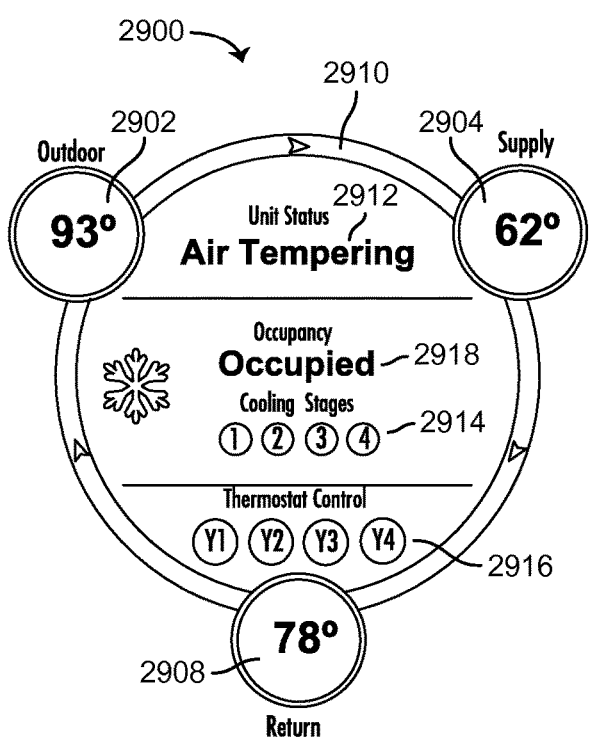
Figure 30:
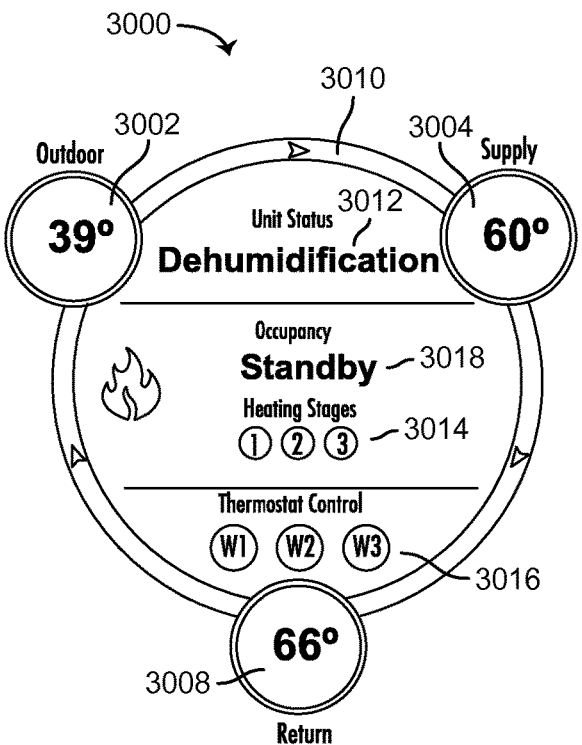

Referring specifically to FIGS. 29-30, user interfaces 2900 and 3000 are shown displaying an outdoor temperature 2902 and 3002, a supply air temperature 2904 and 3004, and a return air temperature 2908 and 3008. Each of data values 2902-2908 and 3002-3008 may be mapped to an attribute of an equipment object which serves the space. For example, data values 2902-2908 and 3002-3008 may be mapped to user interfaces 2900 and 3000 from data points associated with a rooftop unit that serves the space. An operating status 2912 and 3012 of the rooftop unit (e.g., air tempering, dehumidification) is shown in an upper portion of circles 2910 and 3010.

A more detailed status 2914 and 3014 of the current operating state is shown in a middle portion of circles 2910 and 3010. Numbered circles indicate stages of heating or cooling that are available for the rooftop unit. Circles that are filled in (e.g., darkened, colored, etc.) indicate that the corresponding stage is currently powered. Occupancy status indicators 2918 and 3018 provide an indication of the current occupancy status of the space (e.g., occupied, unoccupied). The lower portions of circles 2910 and 3010 displays thermostat control systems for the space.

Referring specifically to FIGS. 31-32, user interfaces 3100 and 3200 are shown displaying an outdoor temperature 3102 and 3202, a supply air temperature 3104 and 3204, and a return air temperature 3108 and 3208. User interface 3200 is shown to include an additional indication of an operating setpoint 3206. Each of data values 3102-3108 and 3202-3208 may be mapped to an attribute of an equipment object which serves the space. For example, data values 3102-3108 and 3202-3208 may be mapped to user interfaces 3100 and 3200 from data points associated with a rooftop unit that serves the space. An operating status 3112 and 3212 of the rooftop unit (e.g., air tempering, idle) is shown in an upper portion of circles 3110 and 3210. Occupancy status indicator 3118 and 3218 provide an indication of the current occupancy status of the space (e.g., occupied, unoccupied). The lower portion of circles 3210 displays the current temperature of the space.

Figures 34, 35:
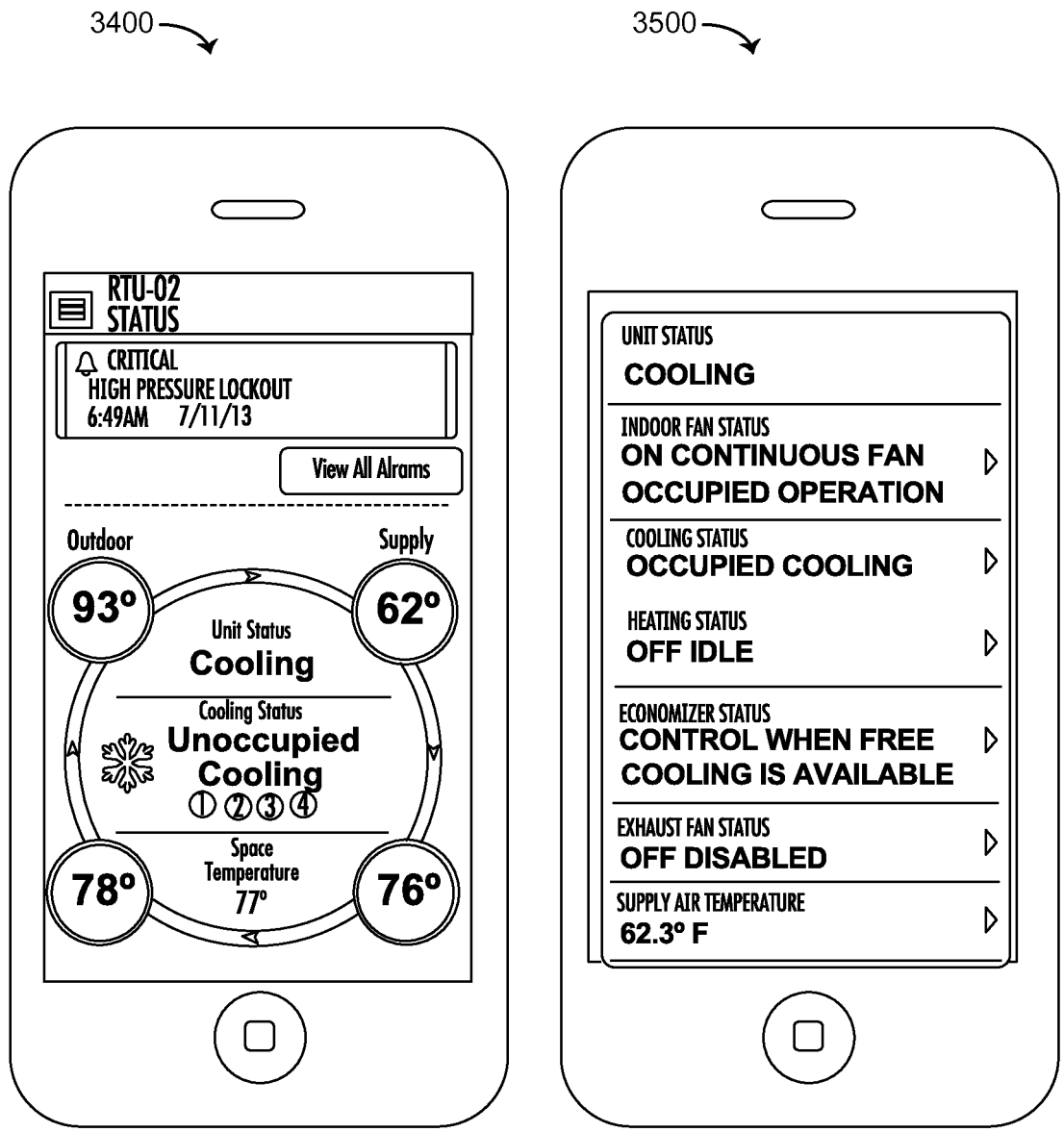
FIGS. 34-35 are drawings of the user interface of FIG. 33 displayed via a mobile device such as a smartphone, according to an exemplary embodiment.

Referring now to FIGS. 33-35, user interfaces 2700-3200 can be displayed to client devices in a variety of formats. For example, FIG. 33 shows user interface 2700 presented as part of a larger interface 3300. User interface 3300 displays the circle of comfort as primary content in the middle column of interface 3300. User interface 3300 is shown to include an equipment selector 3302 (e.g., a drop down menu) configured to receive a user selection of various BAS devices. When a different device is selected via equipment selector 3302, user interface 2700 may be replaced with a user interface corresponding to the selected BAS device.

In some embodiments, user interface 3300 includes display data 3304. Display data 3304 may include one or more attributes and/or values of the equipment object corresponding to the selected BAS device. In some embodiments, the items displayed in display data 3304 are determined by referencing the equipment definition used to create the equipment object. For example, the point definitions designated in display data in the equipment definition may be displayed in user interface 3300. Arrows on each item of display data 3304 indicate that clicking on an item may cause a related folder within details view 3310 to be displayed.

Still referring to FIG. 33, user interface 3300 is shown to include an alarms portion 3306. Alarms portion 3306 may display all active critical alarms in a time descending order (e.g., most recent on top). Selecting the "view all alarms" icon 3308 may cause an alarms view 3312 to be displayed.

Referring now to FIGS. 34 and 35, user interface 3300 is shown displayed on a mobile device. Due to the limited screen size of the mobile device, user interface 2700 and alarms portion 3306 are displayed in first view 3400 and display data 3304 are displayed in a second view 3500. Views 3400 and 3500 may be different views of the same page or different pages. User interface 3300 may be displayed on a wide variety of client devices such as desktop computers, client terminals, laptop computers, tablets, portable communications devices, smart phones, and other types of portable or non-portable electronic devices.

Referring now to FIG. 36, a flowchart of a process 3600 for creating an equipment definition for a type of building equipment in a building automation system is shown, according to an exemplary embodiment. Process 3600 may be performed by BAS controller 12 (as described with reference to FIG. 3) to create equipment definitions for various types of building equipment and to store the equipment definitions in equipment definitions 140. In some embodiments, equipment definitions are created by abstracting data points provided by archetypal BAS devices (e.g., typical or representative devices) of various types of building equipment.

Process 3600 is shown to include receiving a user selection of an archetypal device of a type of building equipment of a building automation system (step 3602). In various embodiments, the archetypal device may be specified as a user input or selected automatically (e.g., by equipment definition module 154). Step 3602 may include selecting or receiving a user selection of a terminal unit such as a VMA.

Still referring to FIG. 36, process 3600 is shown to include identifying one or more data points associated with the archetypal device (step 3604). Step 3604 may include accessing a network of data points provided by BAS 11. The network of data points may be a hierarchical representation of data points that are measured, calculated, or otherwise obtained by various BAS devices. BAS devices may be represented in the network of data points as nodes of the hierarchical representation with associated data points for each BAS device. Step 3604 may include finding the node corresponding to the archetypal device in the network of data points and identifying one or more data points which associated with the archetypal device node.

Process 3600 is shown to include generating a point definition for each identified data point of the archetypal device (step 3606). Each point definition may include an abstraction of the corresponding data point that is applicable to multiple different devices of the same equipment type. For example, an archetypal device such as a VMA (i.e., "VMA-20") may be associated equipment-specific data points such as "VMA-20.DPR-POS" (i.e., the damper position of VMA-20) and/or "VMA-20.SUP-FLOW" (i.e., the supply air flow rate through VMA-20). Step 3606 may include abstracting the equipment-specific data points to generate abstracted data point types that are generally applicable to other equipment of the same type. For example, step 3606 may include abstracting the equipment-specific data point "VMA-20.DPR-POS" to generate the abstracted data point type "DPR-POS" and abstracting the equipment-specific data point "VMA-20.SUP-FLOW" to generate the abstracted data point type "SUP-FLOW." Advantageously, the abstracted data point types generated in step 3606 can be applied to multiple different variants of the same type of building equipment (e.g., VMAs from different manufacturers, VMAs having different models or output data formats, etc.).

In some embodiments, step 3606 includes generating a user-friendly label for each point definition. The user-friendly label may be a plain text description of the variable defined by the point definition. For example, step 3606 may include generating the label "Supply Air Flow" for the point definition corresponding to the abstracted data point type "SUP-FLOW" to indicate that the data point represents a supply air flow rate through the VMA. The labels generated in step 3606 may be displayed in conjunction with data values from BAS devices as part of a user-friendly interface.

In some embodiments, step 3606 includes generating search criteria for each point definition. The search criteria may include one or more parameters for identifying another data point (e.g., a data point associated with another controller of BAS 11 for the same type of building equipment) that represents the same variable as the point definition. Search criteria may include, for example, an instance number of the data point, a network address of the data point, and/or a network point type of the data point.

In some embodiments, search criteria includes a text string abstracted from a data point associated with the archetypal device. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BAS devices (e.g., "VMA-18.SUP-FLOW," "SUP-FLOW.VMA-01," etc.). Step 3606 may include storing a name, label, and/or search criteria for each point definition in memory 138.

Still referring to FIG. 36, process 3600 is shown to include using the generated point definitions to create an equipment definition for the type of building equipment (step 3608). Each equipment definition may apply to building equipment of a particular type and may be created for the same type of building equipment as the archetypal device. The equipment definition may include one or more of the generated point definitions. Each point definition defines a potential attribute of BAS devices of the particular type and provides search criteria for identifying the attribute among other data points provided by such BAS devices.

In some embodiments, the equipment definition created in step 3608 includes an indication of display data for BAS devices that reference the equipment definition. Display data may define one or more data points of the BAS device that will be displayed via a user interface. In some embodiments, display data are user defined. For example, step 3608 may include prompting a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, step 3608 includes providing a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

In some embodiments, step 3608 can be repeated for various different types of archetypal devices to generate an equipment definition for each different type of building equipment in BAS 11 (e.g., VMAs, chillers, AHUs, etc.). Process 3600 may conclude with storing the equipment definitions in a data storage device (e.g., memory 138, equipment definitions 140, an external or remote data storage device, etc.) (step 3610).

Referring now to FIG. 37, a flowchart of a process 3700 for using an equipment definition to create an equipment object representing building equipment of a building automation system is shown, according to an exemplary embodiment. Process 3700 may be performed by BAS controller 12 (as described with reference to FIG. 3) to create equipment objects for various BAS devices and to store the equipment objects in equipment objects 144. In some embodiments, equipment objects are created by referencing the equipment definitions created using process 3600.

Process 3700 is shown to include receiving an equipment definition including one or more point definitions (step 3702). Each point definition may include an abstraction of a data point associated with an archetypal device of the building automation system. Point definitions may include, for example, a name (e.g., a user-friendly label), a short name (e.g., an abbreviation of the user-friendly label), and/or search criteria for each point definition. The search criteria may include one or more parameters for identifying a data point that corresponds to the same variable as the point definition. Search criteria may include, for example, an instance number of the data point, a network address of the data point, and/or a network point type of the data point. In some embodiments, search criteria includes a text string abstracted from a data point associated with the archetypal device.

Still referring to FIG. 37, process 3700 is shown to include identifying a second device of the building automation system of the same type as the archetypal device (step 3704). Step 3704 may include identifying a BAS device of BAS 11 to which the equipment definition received in step 3702 applies. For example, step 3704 may include identifying a BAS device that is of the same type of building equipment as the archetypal BAS device used to generate the equipment definition.

In various embodiments, the BAS device may be identified automatically (e.g., by equipment object creation module 156), manually (e.g., by a user) or semi-automatically (e.g., by a user in response to an automated prompt from equipment object creation module 156). In some embodiments, step 3704 includes identifying one or more BAS devices that have been selected by a user (e.g., dragged and dropped into an equipment discovery table). Step 3704 may include identifying a single BAS device or multiple BAS devices.

Step 3704 may be performed before or after step 3702. For embodiments in which step 3702 is performed first, step 3704 may include identifying and/or selecting one or more BAS devices that are of the same type as the BAS device used to create the equipment definition.

For embodiments in which step 3704 is performed first, step 3702 may include selecting an equipment definition that applies to the BAS device identified in step 3704. The type of BAS device to which an equipment definition applies may be stored as an attribute of the equipment definition. Step 3702 may include identifying the type of BAS device selected in step 3704 and retrieving the corresponding equipment definition from the data storage device. For example, if the BAS device identified in step 3704 is a VMA, step 3702 may include retrieving the equipment definition for VMAs. If the BAS device identified in step 3704 is a chiller step 3702 may include retrieving the equipment definition for chillers.

Still referring to FIG. 37, process 3700 is shown to include using the equipment definition to automatically identify one or more data points associated with the second device that satisfy one or more of the point definitions (step 3706). Step 3706 may include accessing a network of data points (e.g., data points network 1000) to identify all of the data points associated with the second BAS device. If multiple BAS devices are identified in step 3704 (e.g., if a user drags multiple BAS devices into the equipment discovery table), step 3706 may include identifying a list of data points associated with each BAS device.

Step 3706 may include accessing the equipment definition received in step 3702 to identify search criteria for each of the point definitions. In some embodiments, step 3706 includes using the search criteria to determine which of the data points in the list of data points satisfy the point definitions. For example, step 3706 may include searching attributes of the data points for values that match one or more of search criteria. In some embodiments, step 3706 is performed as an iterative process for each BAS device and each point definition (described in greater detail with reference to FIG. 22).

Still referring to FIG. 37, process 3700 is shown to include automatically mapping the identified data points of the second device to an equipment object representing the second device (step 3708). Step 3708 may include mapping each of the identified data points to an attribute of the equipment object. The equipment object may have attributes that correspond to the point definitions of the equipment definition received in step 3702. Each attribute of the equipment object may correspond to a different point definition. An example of such an equipment object is shown in FIG. 21.

Step 3708 may include mapping a data point to an attribute of the equipment object in response to a determination that the data point satisfies the search criteria of the point definition corresponding to the attribute. Advantageously, step 3708 may be performed in an automated fashion to automatically map data points to equipment object attributes. The automated identification and mapping of data points facilitates the mass creation of equipment objects for many different BAS devices (e.g., hundreds, thousands).

Figure 38:
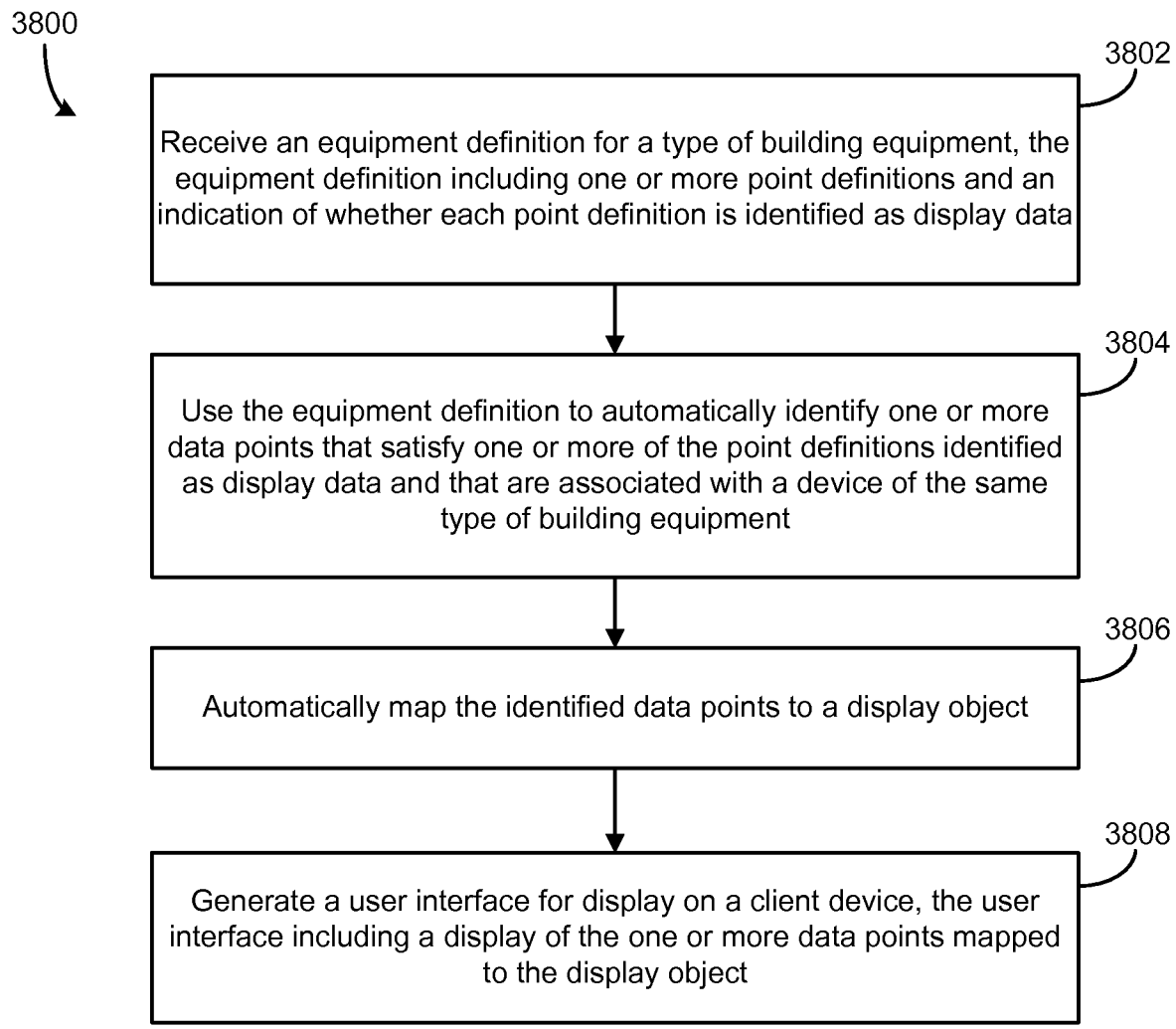
FIG. 38 is a flowchart of a process for providing a display of data points associated with building equipment of a building automation system, according to an exemplary embodiment.

Referring now to FIG. 38, a flowchart of a process 3800 for providing a display of data points associated with building equipment of a building automation system is shown, according to an exemplary embodiment. Process 3800 may be performed by BAS controller 12 (as described with reference to FIG. 3) to provide a user interface for monitoring and/or controlling BAS devices and spaces in a building automation system.

Process 3800 is shown to include receiving an equipment definition for a type of building equipment (step 3802). The equipment definition may include one or more point definitions. Each point definition may include an abstraction of a data point associated with an archetypal device of the building automation system. Point definitions may include, for example, a name (e.g., a user-friendly label), a short name (e.g., an abbreviation of the user-friendly label), and/or search criteria for each point definition. The search criteria may include one or more parameters for identifying a data point that corresponds to the same variable as the point definition. Search criteria may include, for example, an instance number of the data point, a network address of the data point, and/or a network point type of the data point. In some embodiments, search criteria includes a text string abstracted from a data point associated with the archetypal device.

The equipment definition may include an indication of whether each point definition is identified as display data. Display data may include one or more types of data points that will be displayed via a user interface for BAS devices that reference the equipment definition. In some embodiments, display data are user defined. Point definitions can be indicated as display data, for example, by selecting the point definition or marking the point definition as display data (e.g., checking a box next to the point definition). Display data may include the user-friendly label and/or short name associated with the selected point definitions.

Still referring to FIG. 38, process 3800 is shown to include using the equipment definition to automatically identify one or more data points that satisfy one or more of the point definitions identified as display data and that are associated with a device of the same type of building equipment (step 3804). The BAS device may be any device to which the equipment definition applies (i.e., a device of the same type as the archetypal BAS device used to create the equipment definition.

In some embodiments, step 3804 includes accessing a network of data points (e.g., data points network 1000) to identify all of the data points associated with a BAS device. Step 3804 may include accessing the equipment definition received in step 3802 to identify search criteria for each of the point definitions. In some embodiments, step 3804 includes using the search criteria to determine which of the data points satisfy the point definitions. For example, step 3804 may include searching attributes of the data points for values that match one or more of search criteria.

In other embodiments, step 3804 includes accessing an equipment object associated with the BAS device to identify one or more data points associated with the device. The equipment object may define a mapping between attributes of the equipment object and data points. The data points associated with the equipment object can be assumed to satisfy at least one of the point definitions (e.g., since satisfying a point definition may be required for a data point to be mapped to an attribute of the equipment object).

Step 3804 may include determining which of the point definitions are listed as display data in the equipment definition. Point definitions can be listed as display data by a user (e.g., be selecting various point definitions) or automatically (e.g., by smart equipment, by a controller, etc.). In various embodiments, display data can be set by listing one or more point definitions or otherwise indicating that data points qualify as display data. The equipment definition received in step 3802 can be referenced to identify one or more point definitions that are indicated as display data. Step 3804 may include identifying data points that satisfy at least one of the point definitions that are indicated as display data.

Still referring to FIG. 38, process 3800 is shown to include automatically mapping the identified data points to a display object (step 3806). The display object may be an equipment object (e.g., one of equipment objects 144), a building object (e.g., one of building objects 142), or another software object to which a data point can be mapped. The display object may represent a particular BAS device, a particular space, or a combination of both. In some embodiments, the display object includes data points mapped from multiple different BAS devices. For example, the display object may represent a space within a building and may be mapped to data points provided by multiple different devices that serve the space (e.g., a VAV box, a lighting fixture, a window sensor, etc.).

Still referring to FIG. 38, process 3800 is shown to include generating a user interface for display on a client device, the user interface including a display of the one or more data points mapped to the display object (step 3808). The user interface may be a graphical user interface for monitoring or controlling a BAS device and/or a space. For example, the user interface may be the same or similar to user interface 2400 or any of user interfaces 2700-3300 as described with reference to FIG. 24 and FIGS. 27-35.

Figure 39:
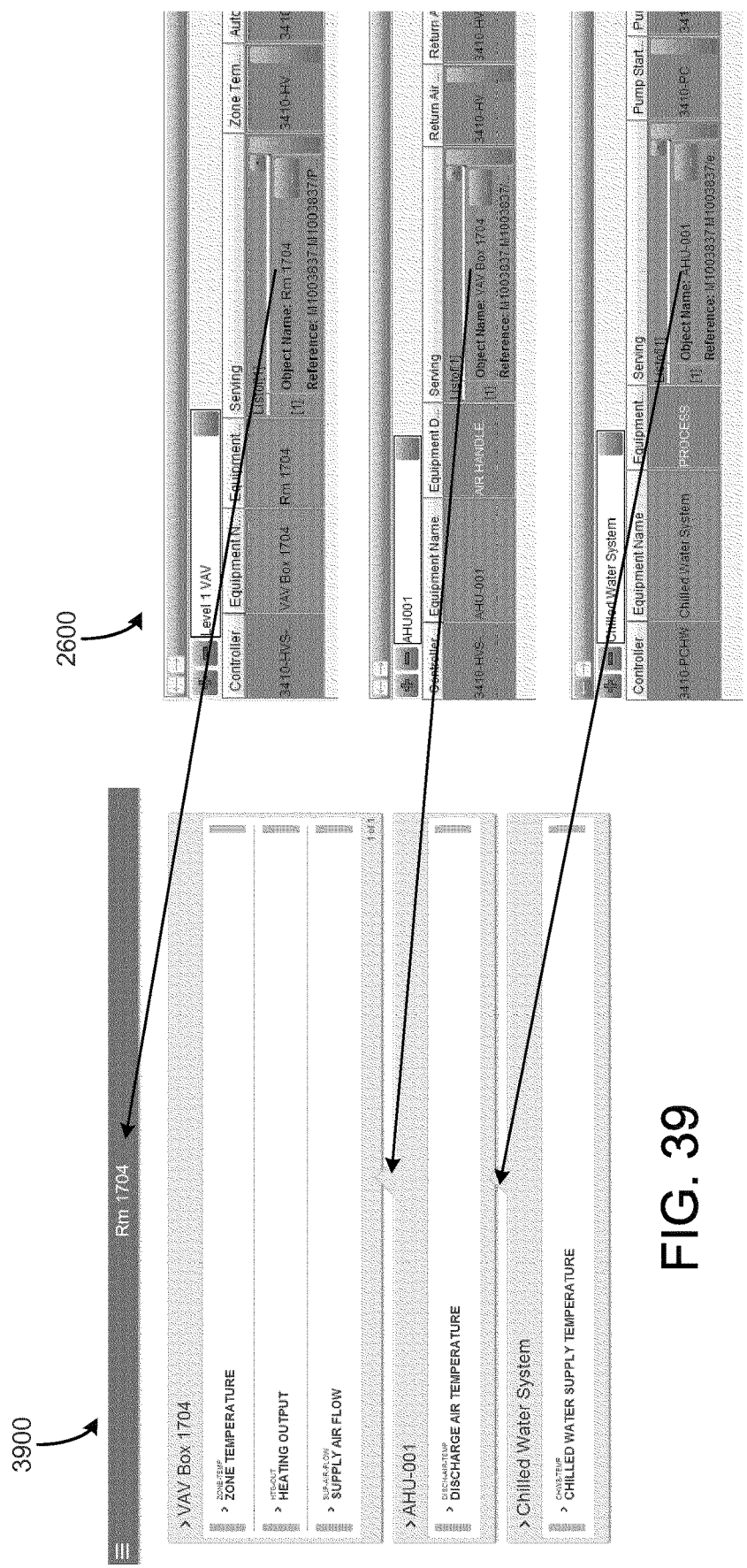
FIG. 39 is a drawing of a user interface for visualizing "served by" relationships between building equipment and other building equipment and/or spaces, according to an exemplary embodiment.

Referring now to FIG. 39, a "served by" interface 3900 is shown, according to an exemplary embodiment. Interface 3900 provides a visualization of the building equipment that serves a particular space (i.e., "Rm 1704" in FIG. 39) and indicates relationships between such building equipment. For example, interface 3900 indicates that the space "Rm 1704" is served by VAV box 1704, AHU-001, and a chilled water system. Building equipment that most directly serves a space (e.g., equipment located in the space or which has a most direct relationship to the space) may be displayed near the top of interface 3900, whereas building equipment that more indirectly serves the space may be displayed further toward the bottom of interface 3900.

The arrows connecting building equipment in interface 3900 indicate serving relationships between the building equipment. For example, an arrow pointing from the chilled water system toward AHU-001 indicates that the chilled water system serves AHU-001. Similarly, an arrow pointing from AHU-001 to VAV box 1704 indicates that AHU-001 serves VAV box 1704. All of the building equipment shown in interface 3900 is displayed under the "Rm 1704" heading, indicating that all of the displayed equipment serves room 1704. The attributes of each BAS device shown in interface 3900 may be mapped from the corresponding equipment object, as described with reference to FIGS. 23-24.

The equipment relationships illustrated in interface 3900 may be established during equipment discovery (as described with reference to FIGS. 16-18) or by dragging and dropping objects into relationship table 2600 (as described with reference to FIGS. 25-26). The "serving" relationships indicated in relationship table 2600 may be used to generate interface 3900. For example, the relationship table 2600 for the building equipment shown in interface 3900 indicates that VAV box 1704 serves Rm 1704, that AHU-001 serves VAV box 1704, and that the chilled water system serves AHU-001. These relationships are reflected in interface 3900 as arrows between building equipment (e.g., the arrows between VAV box 1704, AHU-001, and the chilled water system) and the heading of the space served by the building equipment (i.e., Rm 1704).

The construction and arrangement of the systems and methods as shown in the various exemplary embodiments are illustrative only. Although only a few embodiments have been described in detail in this application, many modifications are possible. For example, the position of elements may be varied and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present application.

The present application contemplates methods, systems and program products on any machine-readable media for accomplishing various operations. The embodiments of the present application may be implemented using existing computer processors, or by a special purpose computer processor for an appropriate system, incorporated for this or another purpose, or by a hardwired system.

Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for creating an equipment definition for a type of building equipment in a building automation system, the method comprising:
 operating an archetypal device of the type of building equipment to affect a variable state or condition within a building;

identifying, by a processing circuit, one or more data points associated with the archetypal device, each of the identified data points comprising a text string specific to the archetypal device;

automatically creating, for each of the identified data points, an abstraction of the text string specific to the archetypal device by the processing circuit, wherein the abstraction of the text string comprises a portion of the text string that is applicable to multiple different devices of the same type of building equipment;

generating a point definition for each identified data point associated with the archetypal device by the processing circuit, each point definition comprising the abstraction of the text string of a corresponding data point of the identified data points;

using the generated point definitions to create the equipment definition for the type of building equipment by the processing circuit, the equipment definition comprising one or more of the generated point definitions;

using the equipment definition to automatically identify one or more data points associated with a second device of the same type of building equipment;

automatically mapping the identified data points of the second device to an equipment object representing the second device; and generating a label for each of a plurality of point definitions, wherein the label is a description of an associated point definition.

2. The method of claim 1, further comprising:
providing a user interface to a client device, the user interface comprising a display of one or more devices of the building automation system; and
receiving a user selection of the archetypal device via the user interface.

3. The method of claim 1, wherein each point definition comprises a criterion for identifying a data point associated with the second device of the same type of building equipment of the building automation system.

4. The method of claim 3, wherein the criterion for identifying the data point associated with the second device comprises at least one of:
an instance number of the data point associated with the second device;
a network address of the data point associated with the second device; and
a network point type of the data point associated with the second device.

5. The method of claim 3, wherein the criterion for identifying the data point associated with the second device comprises the abstraction of the text string of the corresponding data point of the archetypal device.

6. The method of claim 1, further comprising providing a user interface for visualizing the equipment definition to a client device, the user interface comprising:
a point definition portion comprising a display of the generated point definitions;
a user input portion configured to receive a user selection of one or more of the point definitions displayed in the point definition portion; and
a display data portion comprising an indication of an abstracted data point corresponding to each of the point definitions selected via the user input portion.

7. The method of claim 1, further comprising:
receiving a user selection of one or more of the point definitions; and
automatically mapping one or more data points of a second device that satisfy the selected point definitions to a user interface for visualizing data associated with the second device.

8. The method of claim 1, further comprising:
associating the equipment definition with a category of building equipment; and
using the equipment definition to filter building equipment of the building automation system by the category associated with the equipment definition.

9. The method of claim 1, further comprising displaying one or more of the data points that are mapped to a display object.

10. A method for creating and using an equipment object representing building equipment of a building automation system, the method comprising:
obtaining, by a processing circuit, an equipment definition for a type of building equipment, the equipment definition comprising one or more point definitions, each point definition comprising an abstraction of a text string extracted from a data point associated with an archetypal device of the type of building equipment;
identifying, by the processing circuit, a second device of the building automation system of the same type as the archetypal device;
using, by the processing circuit, the equipment definition to automatically identify one or more data points associated with the second device that satisfy one or more of the point definitions;
automatically mapping, by the processing circuit, the identified data points of the second device to an equipment object representing the second device;
using, by the processing circuit, the equipment object to monitor and control the second device to affect a variable state or condition within a building;
using the equipment definition to automatically identify one or more of the point definitions indicated as display data;
automatically mapping a data point of the second device to a display object representing the second device in response to a determination that the data point satisfies one or more of the point definitions indicated as display data; and
generating a label for each of a plurality of point definitions wherein the label is a description of an associated point definition.

11. The method of claim 10, wherein each point definition comprises a criterion for identifying a data point associated with the second device.

12. The method of claim 11, wherein the criterion for identifying the data point associated with the second device comprises at least one of:
an instance number of the data point;
a network address of the data point; and
a network point type of the data point.

13. The method of claim 11, wherein the criterion for identifying the data point associated with the second device comprises the abstraction of the text string extracted from a corresponding data point associated with the archetypal device.

14. The method of claim 10, wherein using the equipment definition to identify one or more data points associated with the second device comprises:
extracting a search criterion from each point definition of the equipment definition;

accessing a network of the building automation system to determine the one or more data points associated with the second device;

using the extracted search criterion to search the data points of the second device for a data point that satisfies the search criterion; and identifying the data point that satisfies the search criterion as a data point associated with the second device that satisfies one or more of the point definitions.

15. The method of claim 10, wherein automatically mapping the identified data points of the second device to the equipment object comprises:

determining a network address for each identified data point of the second device; and mapping the network address for each identified data point of the second device to the equipment object representing the second device.

16. The method of claim 15, wherein determining a network address for each identified data point of the second device comprises:

accessing a data point network for the building automation system; and using the data point network to identify an existing relationship between the network address and an identified data point of the second device.

17. The method of claim 10, further comprising providing a user interface to a client device, the user interface comprising a display of the one or more data points mapped to the display object.

18. The method of claim 10, wherein the label is a plain text description of the associated point definition.

19. A method for providing a display of data points associated with building equipment of a building automation system, the method comprising:

obtaining, by a processing circuit, an equipment definition for a type of building equipment, the equipment definition comprising one or more point definitions and an indication of whether each point definition is identified as display data, each point definition comprising an abstraction of a text string extracted from a data point associated with an archetypal device of the type of building equipment;

using, by the processing circuit, the equipment definition to automatically identify one or more data points that satisfy one or more of the point definitions identified as display data and are associated with a second device of the same type of building equipment;

automatically mapping, by the processing circuit, the identified data points to a display object;

generating a user interface for display on a client device by the processing circuit, the user interface comprising a display of the one or more data points mapped to the display object;

using the display object to monitor and control the second device to affect a variable state or condition within a building;

generating a label for each of a plurality of point definitions wherein the label is a description of an associated point definition;

wherein each point definition comprises a search criterion for identifying the data point associated with the second device, the search criterion comprising the abstraction of the text string extracted from the data point associated with the archetypal device.

20. The method of claim 19, wherein the label is a plain text description of the associated point definition.

* * * * *